(12) United States Patent
Bondi et al.

(10) Patent No.: US 12,007,093 B2
(45) Date of Patent: Jun. 11, 2024

(54) THREE PART HEADLAMP ASSEMBLY

(71) Applicant: COVESTRO LLC, Pittsburgh, PA (US)

(72) Inventors: Mark G. Bondi, Pittsburgh, PA (US);
James M. Lorenzo, Mars, PA (US);
Mark M. Matsco, Monaca, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/767,254

(22) PCT Filed: Oct. 14, 2020

(86) PCT No.: PCT/US2020/055492
§ 371 (c)(1),
(2) Date: Apr. 7, 2022

(87) PCT Pub. No.: WO2021/076561
PCT Pub. Date: Apr. 22, 2021

(65) Prior Publication Data
US 2022/0397258 A1    Dec. 15, 2022

Related U.S. Application Data

(60) Provisional application No. 62/915,283, filed on Oct. 15, 2019, provisional application No. 62/915,850, filed on Oct. 16, 2019.

(30) Foreign Application Priority Data

Mar. 13, 2020    (EP) .................................... 20163082

(51) Int. Cl.
*F21S 41/29*    (2018.01)
*F21S 41/55*    (2018.01)
(Continued)

(52) U.S. Cl.
CPC ............. *F21S 45/49* (2018.01); *F21S 41/295* (2018.01); *F21S 41/55* (2018.01); *F21S 45/48* (2018.01); *F21V 29/87* (2015.01)

(58) Field of Classification Search
CPC .......... F21S 41/29; F21S 43/27; F21V 17/101
See application file for complete search history.

(56) References Cited

U.S. PATENT DOCUMENTS 2,991,273 A    7/1961    Wilhelm et al.
2,999,835 A    9/1961    Goldberg
(Continued)

FOREIGN PATENT DOCUMENTS

DE    2036052 A1    1/1972
DE    2407776 A1    9/1975
(Continued)

OTHER PUBLICATIONS

Ullmann's Encyklopädie der Technischen Chemie, vol. 19, 1980, p. 280 et seq.
(Continued)

*Primary Examiner* — Sean P Gramling
(74) *Attorney, Agent, or Firm* — Richard P. Bender; John E. Mrozinski, Jr.

(57) ABSTRACT

An assembly comprises a housing, a bezel and a lens, or a housing heat sink, a housing rim, a bezel and a lens, wherein the housing or the housing heat sink comprises a first surface and the bezel or the housing rim comprises a second surface, a portion of a first surface of the housing or housing heat sink is molded to a portion of the second surface forming an interface surface, the interface surface having an interface angle that does not deviate more than 90 degrees, measured from a central axis perpendicular to the bezel and the housing around which the bezel and the housing are molded, for all interface angles about the central axis.

14 Claims, 7 Drawing Sheets

Figure 1:
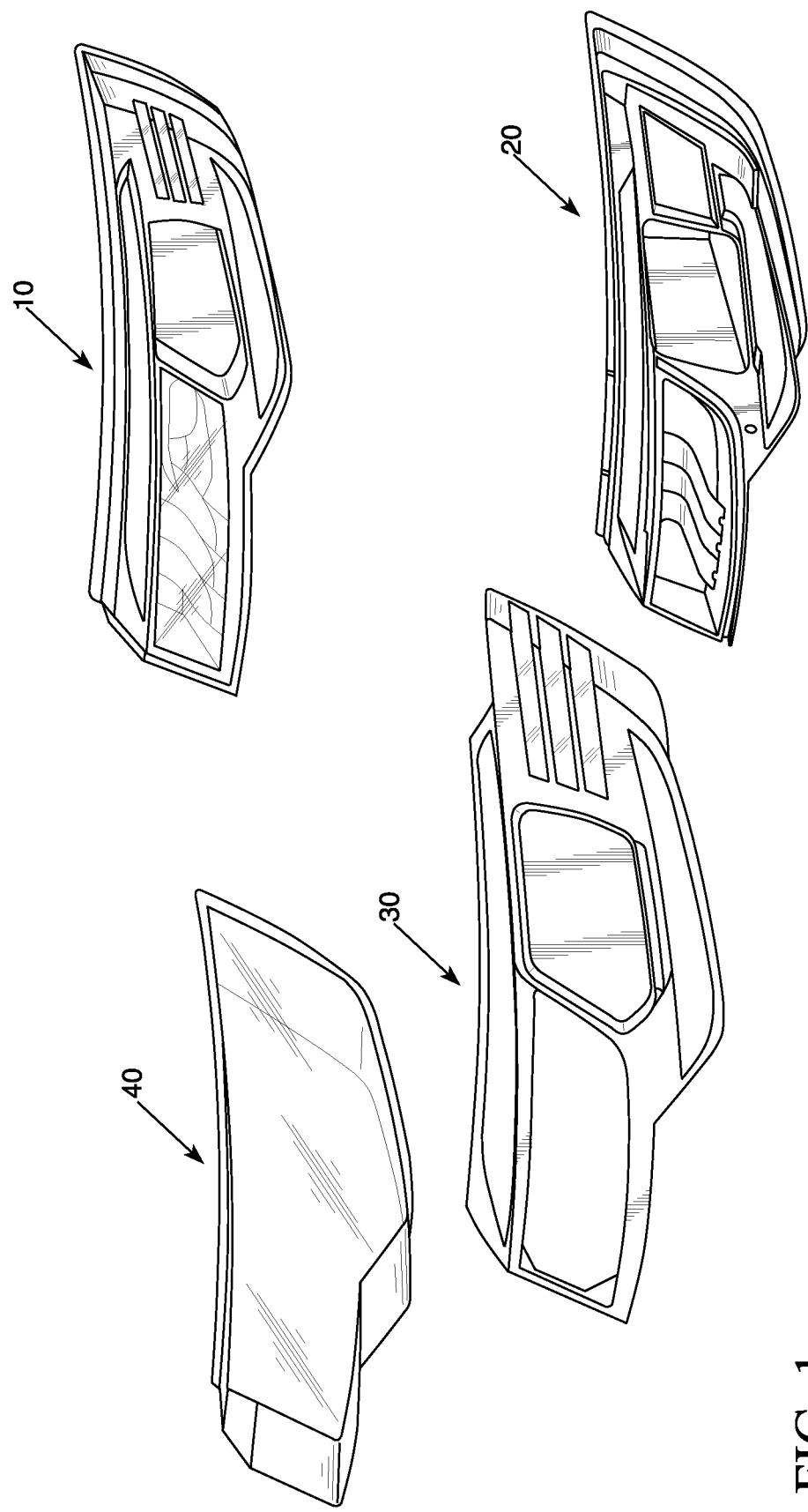

(51) Int. Cl.
  *F21S 43/27* (2018.01)
  *F21S 45/48* (2018.01)
  *F21S 45/49* (2018.01)
  *F21V 17/10* (2006.01)
  *F21V 29/87* (2015.01)

(56) References Cited

U.S. PATENT DOCUMENTS

| | | |
|---|---|---|
| 2,999,846 A | 9/1961 | Hermann et al. |
| 3,148,172 A | 9/1964 | Fox |
| 3,271,367 A | 9/1966 | Hermann et al. |
| 3,644,574 A | 2/1972 | Jackson, Jr. et al. |
| 3,692,744 A | 9/1972 | Rich et al. |
| 4,013,613 A | 3/1977 | Abolins et al. |
| 4,101,513 A | 7/1978 | Fox et al. |
| 4,176,224 A | 11/1979 | Bier et al. |
| 4,395,463 A | 7/1983 | Kray |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,937,285 A | 6/1990 | Wittmann et al. |
| 4,982,014 A | 1/1991 | Freitag et al. |
| 5,041,313 A | 8/1991 | Patel |
| 5,097,002 A | 3/1992 | Sakashita et al. |
| 5,340,905 A | 8/1994 | Kühling et al. |
| 5,391,795 A | 2/1995 | Pickett |
| 5,672,645 A | 9/1997 | Eckel et al. |
| 5,717,057 A | 2/1998 | Sakashita et al. |
| 5,869,185 A | 2/1999 | Bahr et al. |
| 6,048,919 A | 4/2000 | McCullough |
| 6,350,512 B1 | 2/2002 | Hurley et al. |
| 6,596,840 B1 | 7/2003 | Kratschmer et al. |
| 6,740,730 B1 | 5/2004 | Kratschmer et al. |
| 7,235,918 B2 | 6/2007 | McCullough et al. |
| 8,092,044 B1* | 1/2012 | Sikora ............... F21V 29/87 362/249.02 |
| 2003/0094600 A1 | 5/2003 | Döbler et al. |
| 2003/0122114 A1 | 7/2003 | Döbler et al. |
| 2004/0044119 A1 | 3/2004 | Etzrodt et al. |
| 2004/0158026 A1 | 8/2004 | Kauth et al. |
| 2005/0165148 A1 | 7/2005 | Bogerd et al. |
| 2005/0272845 A1 | 12/2005 | Miller |
| 2006/0052491 A1 | 3/2006 | Braig et al. |
| 2006/0234061 A1 | 10/2006 | Buckel et al. |
| 2008/0217577 A1 | 9/2008 | Hayes |
| 2008/0287585 A1 | 11/2008 | Brown |
| 2009/0093589 A1 | 4/2009 | Bruchmann et al. |
| 2009/0136730 A1 | 5/2009 | Nakano et al. |
| 2009/0258978 A1 | 10/2009 | Ruediger et al. |
| 2009/0318578 A1 | 12/2009 | Versteeg et al. |
| 2010/0072416 A1 | 3/2010 | Fujioka et al. |
| 2011/0103021 A1 | 5/2011 | Janssen et al. |
| 2011/0272646 A1 | 11/2011 | Meyer |
| 2011/0292502 A1 | 12/2011 | Meyer et al. |
| 2011/0293921 A1 | 12/2011 | Meyer et al. |
| 2014/0356551 A1 | 12/2014 | Thulke et al. |
| 2016/0084490 A1 | 3/2016 | Davis et al. |
| 2017/0002247 A1 | 1/2017 | Sämisch et al. |
| 2018/0023778 A1 | 1/2018 | Gordon et al. |
| 2018/0201780 A1 | 7/2018 | Heuer et al. |
| 2020/0377692 A1 | 12/2020 | Grosser et al. |
| 2020/0393568 A1 | 12/2020 | Grosser et al. |

FOREIGN PATENT DOCUMENTS

| | | |
|---|---|---|
| DE | 3832396 A1 | 2/1990 |
| DE | 10311063 A1 | 9/2004 |
| EP | 363608 A1 | 4/1990 |
| EP | 570165 A2 | 11/1993 |
| GB | 1122003 A | 7/1968 |
| GB | 1229482 A | 4/1971 |
| GB | 1341318 A | 12/1973 |
| GB | 1367790 A | 9/1974 |
| GB | 1464449 A | 2/1977 |
| TW | 201739593 A | 11/2017 |
| WO | 2011013645 A1 | 2/2011 |

OTHER PUBLICATIONS

Ullmann's Enzyklopädie der Technischen Chemie, vol. 18, 1979, p. 301 ff.
Grünwald, H. et al., "Better aluminium mirrors by integrating plasma pretreatment, sputtering, and plasma polymerization for large-scale car headlight production," Surface and Coatings Technology, Jan. 1999, vol. 111, Issues 2-3, pp. 287-296.
Ullmann's Encyclopedia of Industrial Chemistry, 5th ed., vol. A18, VCH, Weinheim, 1991, pp. 368-426.
Susi et al., "X-ray photoelectron spectroscopy of graphitic carbon nanomaterials doped with heteroatoms," Beilstein Journal of Nanotechnology, Jan. 2015, vol. 6, pp. 177-192.
Kunststoff-Handbuch, vol. VIII, Carl-Hanser-Verlag, Munich, 1973. p. 695 et seq.
Legrand, D. G. et al., Handbook of Polycarbonate Science and Technology, Plastics Engineering, New York, Marcel Dekker, Inc., 2000, p. 72 et seq.
Müller et al., Houben-Weyl, Methoden der organischen Chemie, vol. 12, Part 1, Georg Thieme Verlag, Stuttgart, 1963, p. 43.
Schnell, H., Chemistry and Physics of Polycarbonates, New York, Interscience Publishers, 1964, p. 28 and p. 102.
Scholtan, W., et al., "Bestimmung der Teilchengrößenverteilung von Latices mit der Ultrazentrifuge," Kolloid-Zeitschrift und Zeitschrift für Polymere, Aug. 1972, vol. 250, No. 8, pp. 782-796.
International Search Report for PCT/US2020/055492 issued on May 2, 2021 by Andreas Stabel.

* cited by examiner

THREE PART HEADLAMP ASSEMBLY

CROSS REFERENCE TO RELATED APPLICATIONS

This application is a national stage application under 35 U.S.C. § 371 of PCT/US2020/055492, filed Oct. 14, 2020, which claims benefit of European Application No. 20163082.9, filed Mar. 13, 2020, U.S. Provisional Application No. 62/915,850, filed Oct. 16, 2019, and U.S. Provisional Application No. 62/915,283, filed Oct. 15, 2019, all of which are incorporated herein by reference in their entireties.

FIELD OF THE INVENTION

The present invention relates to a headlamp assembly having at least three parts: a housing, a bezel and a lens.

SUMMARY OF THE INVENTION

An assembly comprises a housing, a bezel and a lens, wherein the housing comprises a first surface and the bezel comprises a second surface, a portion of the first surface is molded to a portion of the second surface forming an interface surface, the interface surface having an interface angle that does not deviate more than 90 degrees, measured from a central axis perpendicular to the bezel and the housing around which the bezel and the housing are molded, for all interface angles about the central axis.

A different assembly comprises a thermally conductive housing, a bezel and a lens, wherein the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006.

An assembly comprises a housing heat sink, a housing rim, a bezel and a lens, wherein the housing heat sink comprises a first surface and the housing rim comprises a second surface, a portion of the first surface is molded to a portion of the second surface forming an interface surface, the interface surface having an interface angle that does not deviate more than 90 degrees, measured from a central axis perpendicular to the housing rim around which the housing rim is molded, for all interface angles about the central axis.

In an embodiment, the housing comprises a housing heat sink and a housing rim, and the first surface is a surface of the housing rim. In another embodiment, the lens is thermally welded to the bezel or the housing, preferably laser welded. In a different embodiment, the housing, bezel and lens each comprise polymers that are compatible or miscible with each other. In another, the housing heat sink, housing rim, bezel and lens each comprise polymers that are compatible or miscible with each other.

In yet another embodiment, the housing, bezel and lens each comprise greater than 50 wt. % polycarbonate. In still another, the housing heat sink, housing rim, bezel and lens each comprise greater than 50 wt. % polycarbonate. In another, the lens comprises greater than 80% polycarbonate. In still another, the housing or the housing heat sink has a thermal conductivity of 1-40 W/m-K. In a different embodiment, the housing or the housing heat sink comprises 20-60 wt. % expanded graphite, and 40-80 wt. % polycarbonate. In another different embodiment, the bezel and lens each comprises at least 80 wt. % polycarbonate. In another different embodiment, the housing or the housing heat sink is molded to a reflector.

In another embodiment not yet disclosed, the bezel is opaque or translucent. In another, the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006. In yet another embodiment, the bezel comprises a thermoplastic composition portion having a thickness in the range of 1.0-6.0 mm.

In still another embodiment, the assembly further comprises functional elements attached to the housing, or to the housing heat sink. In another, the functional elements are molded to the housing. In yet another, the housing does not comprise metal. In a different embodiment, there are no attachments between the housing and the bezel, or between the housing heat sink and the bezel, or between the housing rim and the bezel, or between the housing heat sink and the housing rim. In another different embodiment, there are no attachments between the bezel and the lens. In another, there are no adhesives between the housing and the bezel, or between the housing rim and the bezel, or between the housing heat sink and the housing rim. In a different one, there are no adhesives between the bezel and the lens. In another different embodiment, an automotive headlamp or an automotive front end comprises the assembly of any of the preceding embodiments.

DESCRIPTION OF THE INVENTION

In the technology domain there is an increasing need for multi-functional parts that provide a high degree of flexibility in the application design, including a low energy consumption, light weight design, and recyclability, while still being produced in a very efficient manner.

This is desired in different fields like in electronics or automotive applications. Disclosed herein is a functional headlamp assembly comprising different modules which can be firmly assembled, preferably without additional fastening means or adhesives (e.g. screws, fasteners, adhesives, collectively "attachments") that offers high mechanical stability and functionality over the life time of the assembled part while being easy to disassemble, e.g. for subsequent recycling after use. Therefore the present disclosure provides a teaching to use a high share of materials which are compatible or miscible with each other for producing the overall assembly and its respective modules. Not only does this allow for recycling of used material in each module of the assembly but also the recycling of the whole assembly as one part.

Many automotive headlamps are made from cast or stamped metal, or glass fiber filled polypropylene material in the housing, while other polymers may be used in other parts, such as polycarbonate for the lens. As a consequence a gluing step is necessary to join the housing with the lens or other parts. Due to the incompatibility of these two different polymer components, they cannot be mechanically recycled together. Furthermore it is highly desirable to reduce the weight of the component and the carbon footprint of the total assembly, which is difficult to achieve when cast or stamped metal parts are used, such as for the housing heat sink.

Disclosed herein is a headlamp assembly that comprises a housing part comprising a heat sink made of thermally conductive thermoplastic material and a housing rim made of a thermoplastic material having a high mechanical stability, preferably a high impact strength, characterized in that the housing part comprises at least two different types of functional elements, such as lights and sensors, being integrated in the housing part. One or more functional elements may be seamlessly integrated into the housing by injection molding, or by insert molding.

Furthermore, the invention provides a method for efficient manufacture of the inventive assembly, making use of an injection molding process.

Injection molding processes are known in the art, to create molded parts from thermoplastic resins. In such processes, a thermoplastic resin is melted, and injected into a mold, or "shot" into a mold, where the solid part is shaped by the contours of the mold. Two shot injection molding processes have historically existed to allow two different thermoplastic resins, to be included in one mold. The first thermoplastic is injected, and then allowed to cool. Then, the second thermoplastic is injected into the mold, and is molded against the first (cooled) thermoplastic, in addition to being molded against the contours of the mold. The second shot thermoplastic is shaped by the contours of the first (cooled) thermoplastic to enter the mold. This method has several advantages, including creating two separate molded parts, whose outer surfaces have even flat or shaped surfaces to fit together. However, there are limitations having only even surfaces separating two molded thermoplastics. For example, during the cooling process for the second shot, the material may peel away from the first shot material as it shrinks and cools, limiting the ability for thermal transfer to take place across the surfaces. Also, thermal transfer across an even surface is limited by that surface area, which is often the minimum surface area possible, given the space available for the two materials to meet. To overcome this limitation, thermoplastic blends are molded into each other while still hot, with the second shot material having a higher thermal conductivity than the first shot material. In this way, an uneven surface is created between the two materials, which then cool together, promoting adhesion between the surfaces. Also, a larger surface area is created for better thermal transfer between the two materials. In addition, the surface that will be molded together will have a limited variation, such that the angle of the molded surfaces will not change more than 90 degrees. This limit in variation provides a stronger mold between the surfaces, and avoids areas of uneven molding through equal pressure being applied to all surfaces that are being molded together.

In one embodiment, an automotive headlamp comprises three parts: a bezel made from a first thermoplastic composition, a housing made from a second thermoplastic composition, and a lens made from a third thermoplastic composition. In another embodiment, the housing comprises a housing heat sink and a housing rim. At least three separate compositions are used, because thermoplastic compositions that have a high thermal conductivity for a housing which incorporates one or more heat sinks, generally contain particles that result in negative qualities for the thermoplastic compositions needed for the other two parts. Furthermore, the bezel is substantially opaque, while the lens is substantially transparent.

1. Thermoplastic Compositions

Thermoplastic compositions used in association with the present invention may comprise one or more of the following components. The components are then combined into compositions, as they described below. Thermoplastic compositions for reflector materials are described in US Pat. Pub. No. 2014/0356551, which is incorporated by reference. Thermally conductive materials are described in U.S. Pat. Nos. 6,048,919 and 7,235,918; U.S. Pat. App. Pub. Nos. 2005/0272845, 2008/0287585, 2010/0072416 and 2017/0002247; and also published international applications WO 2009/115512, WO 2011/013645 and WO 2017/005735, the disclosures of which are each incorporated by reference herein.

A. Polycarbonates

The process of the present invention utilizes thermoplastic compositions such as ones comprising polycarbonate resins, and optionally copolymers and additives. Suitable polycarbonate resins include homopolycarbonates and copolycarbonates, both linear or branched resins and mixtures thereof.

Polycarbonates in the context of the present invention are either homopolycarbonates or copolycarbonates and/or polyestercarbonates; the polycarbonates may, in a known manner, be linear or branched. According to the invention, it is also possible to use mixtures of polycarbonates. Copolycarbonates can include aliphatic comonomers, such as isosorbide.

A portion of up to 80 mol %, preferably of 20 mol % up to 50 mol %, of the carbonate groups in the polycarbonates used in accordance with the invention may be replaced by aromatic dicarboxylic ester groups. Polycarbonates of this kind, incorporating both acid radicals from the carbonic acid and acid radicals from aromatic dicarboxylic acids in the molecule chain, are referred to as aromatic polyestercarbonates. In the context of the present invention, they are encompassed by the umbrella term of the thermoplastic aromatic polycarbonates.

The polycarbonates are prepared in a known manner from bishydroxyaryl compounds, carbonic acid derivatives, optionally chain terminators and optionally branching agents, with preparation of the polyestercarbonates by replacing a portion of the carbonic acid derivatives with aromatic dicarboxylic acids or derivatives of the dicarboxylic acids, according to the carbonate structural units to be replaced in the aromatic polycarbonates by aromatic dicarboxylic ester structural units.

Dihydroxyaryl compounds suitable for the preparation of polycarbonates are those of the formula (2)

$$HO-Z-OH \qquad (2),$$

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (2) is a radical of the formula (3)

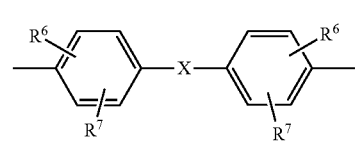

(3)

in which $R^6$ and $R^7$ are each independently H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, —SO$_2$—, —CO—, —O—, —S—, C$_1$- to C$_6$-alkylene, C$_2$- to C$_5$-alkylidene or C$_5$- to C$_6$-cycloalkylidene which may be substituted by C$_1$- to C$_6$-alkyl, preferably methyl or ethyl, or else C$_6$- to C$_{12}$-arylene which may optionally be fused to further aromatic rings containing heteroatoms.

Preferably, X is a single bond, C$_1$- to C$_5$-alkylene, C$_2$- to C$_5$-alkylidene, C$_5$- to C$_6$-cycloalkylidene, —O—, —SO—, —CO—, —S—, —SO$_2$— or a radical of the formula (3a)

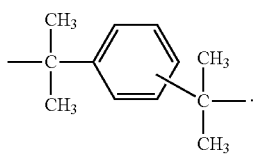

(3a)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes and the ring-alkylated and ring-halogenated compounds thereof.

Examples of bishydroxyaryl compounds suitable for the preparation of the polycarbonates for use in accordance with the invention include hydroquinone, resorcinol, dihydroxydiphenyl, bis(hydroxyphenyl)alkanes, bis(hydroxyphenyl) cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diiso-propylbenzenes and the alkylated, ring-alkylated and ring-halogenated compounds thereof.

Preferred bishydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Additional preferred bishydroxylaryl compounds include at least one monomer unit derived from a bis-(4-hydroxyphenyl) compound, which is bridged via the 1,1'-position of a cyclic hydrocarbon optionally substituted by heteroatoms, preferably one via the 1,1'-(1a), (1b), (1c) and (1d), more preferably a monomer unit bridged over the 1,1'-position of a cyclic hydrocarbon, which is described by the general formula (1a):

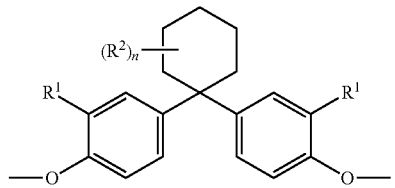

(1a)

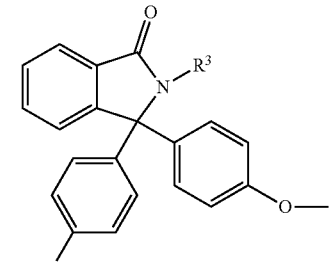

(1b)

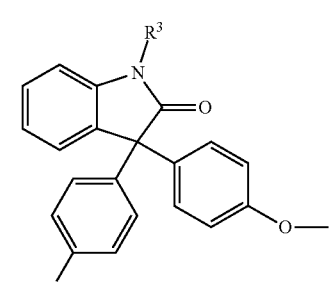

(1c)

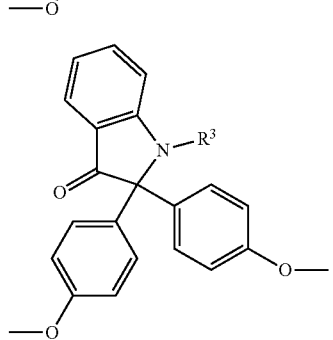

(1d)

in which:
R$^1$ is hydrogen or C$_1$-C$_4$-alkyl, preferably hydrogen,
R$^2$ is C$_1$-C$_4$-alkyl, preferably methyl,
N is 0, 1, 2 or 3, preferably 3, and
R$^3$ is C1-C4-alkyl, aralkyl or aryl, preferably methyl or phenyl, very particularly preferably phenyl.

Particularly preferred bishydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable bishydroxyaryl compounds are described, for example, in U.S. Pat. Nos. 2,999,835 A, 3,148, 172 A, 2,991,273 A, 3,271,367 A, 4,982,014 A and 2,999,846 A, in German published specifications 1,570,703 A, 2,063,050 A, 2,036,052 A, 2,211,956 A and 3,832,396 A, in French patent 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff."

Only one bishydroxyaryl compound is used in the case of the homopolycarbonates; two or more bishydroxyaryl compounds are used in the case of copolycarbonates. The bishydroxyaryl compounds employed, similarly to all other chemicals and assistants added to the synthesis, may be contaminated with the contaminants from their own synthesis, handling and storage. However, it is desirable to employ the purest possible raw materials.

The monofunctional chain terminators needed to regulate the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction together with the bisphenoxide(s) or else added to the synthesis at any time, provided that phosgene or chlorocarbonic acid end groups are still present in the reaction mixture, or, in the case of the acid chlorides and chlorocarbonic esters as chain terminators, provided that sufficient phenolic end groups of the polymer being formed are available. Preferably, the chain terminator(s), however, is/are added after the phosgenation at a site or at a time when no phosgene is present any longer but the catalyst has still not been metered in, or are metered in prior to the catalyst, together with the catalyst or in parallel.

Any branching agents or branching agent mixtures to be used are added to the synthesis in the same manner, but typically before the chain terminators. Typically, trisphenols, quaterphenols or acid chlorides of tri- or tetracarboxylic acids are used, or else mixtures of the polyphenols or of the acid chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri-(4-hydroxyphenyl)heptane, 1,3,5-tris(4-hydroxyphenyl) benzene, 1,1,1-tri-(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, again based on moles of bishydroxyaryl compounds used in each case.

The branching agents can either be initially charged together with the bishydroxyaryl compounds and the chain terminators in the aqueous alkaline phase or added dissolved in an organic solvent prior to the phosgenation.

All these measures for preparation of the polycarbonates are familiar to those skilled in the art.

Aromatic dicarboxylic acids suitable for the preparation of the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the dicarbonyl dihalides and the dialkyl dicarboxylates, especially the dicarbonyl dichlorides and the dimethyl dicarboxylates.

The replacement of the carbonate groups by the aromatic dicarboxylic ester groups proceeds essentially stoichiometrically and also quantitatively, and so the molar ratio of the co-reactants is reflected in the final polyester carbonate. The aromatic dicarboxylic ester groups can be incorporated either randomly or in blocks.

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the first case, the acid derivatives used are preferably phosgene and optionally dicarbonyl dichlorides; in the latter case, they are preferably diphenyl carbonate and optionally dicarboxylic diesters. Catalysts, solvents, workup, reaction conditions etc. for the polycarbonate preparation or polyestercarbonate preparation have been described and are known to a sufficient degree in both cases.

The technique employed to determine the molecular weight of polycarbonate is gel-permeation chromatography (GPC) using polystyrene calibration standards. A Waters Alliance 2695 GPC with refractive index (RI) detection is employed for these analyses. The GPC is controlled, data collected, and data analyzed by Waters Empower chromatography software. The columns employed include three 30 cm SDVB PL Gel Mixed E columns with a 5 µm 2-Mixed D guard column. The mobile phase is tetrahydrofuran (THF). Toluene is used for elution-time correction. The flow rate is 1.0 mL/min. at 35° C., with a run-time of 40 min. Polystyrene calibration standards are used as primary calibrators and CD-2000, 2450 and 3400 are employed as secondary standards. The sample injection volume is 75 µL with a sample concentration of 2.5 mg/mL.

The thermoplastic composition may also include a copolymer, along with additional vinyl monomers such as vinyl aromatic compounds and/or vinyl aromatic compounds substituted on the ring (such as styrene, α-methylstyrene, p-methylstyrene, p-chlorostyrene), methacrylic acid ($C_1$-$C_8$)-alkyl esters (such as methyl methacrylate, ethyl methacrylate, 2-ethylhexyl methacrylate, allyl methacrylate), acrylic acid ($C_1$-$C_8$)-alkyl esters (such as methyl acrylate, ethyl acrylate, n-butyl acrylate, tert-butyl acrylate), polybutadienes, butadiene/styrene or butadiene/acrylonitrile copolymers, polyisobutenes or polyisoprenes grafted with alkyl acrylates or methacrylates, vinyl acetate, acrylonitrile and/or other alkyl styrenes, organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenyl-maleimide). These vinyl monomers can be used on their own or in mixtures of at least two monomers. Preferred monomers in the copolymer can be selected from at least one of the monomers styrene, methyl methacrylate, n-butyl acrylate and acrylonitrile butadiene styrene.

The thermoplastic composition may optionally comprise one or more further commercially available polymer additives such as flame retardants, flame retardant synergists, anti-dripping agents (for example compounds of the substance classes of the fluorinated polyolefins, of the silicones as well as aramid fibers), lubricants and mold release agents (for example pentaerythritol tetrastearate), nucleating agents, stabilizers, antistatic agents (for example conductive blacks, carbon fibers, carbon nanotubes as well as organic antistatic agents such as polyalkylene ethers, alkylsulfonates or polyamide-containing polymers), as well as colorants and pigments.

B. Graft Copolymers

Component B includes one or more graft polymers of

B.1 5 to 95, preferably 20 to 90 wt. %, particularly preferably 30 to 60 wt. % of at least one vinyl monomer on B.2 95 to 5, preferably 80 to 10 wt. %, particularly preferably 70 to 40 wt. % of one or more graft bases.

The glass transition temperature of the graft base is preferably <10° C., further preferably <0° C., and particularly preferably <−20° C.

The graft base B.2 in general has an average particle size (d50 value) of from 0.05 to 10.00 µm, preferably 0.10 to 5.00 µm, further preferably 0.20 to 1.00 µm, and particularly preferably from 0.25 to 0.50 µm.

Monomers B.1 are preferably mixtures of

B.1.1 50 to 99 parts by wt. of vinylaromatics and/or vinylaromatics substituted on the nucleus (such as styrene, α-methylstyrene, p-methylstyrene, p-chlorostyrene) and/or (meth)acrylic acid (C1-C8)-alkyl esters (such as methyl methacrylate, ethyl methacrylate) and B.1.2 1 to 50 parts by wt. of vinyl cyanides (unsaturated nitriles, such as acrylonitrile and methacrylonitrile) and/or (meth)acrylic acid (C1-C8)-alkyl esters, such as methyl methacrylate, n-butyl acrylate, t-butyl acrylate, and/or derivatives (such as anhydrides and imides) of unsaturated carboxylic acids, for example maleic anhydride.

Preferred monomers B.1.1 are chosen from at least one of the monomers styrene, α-methylstyrene and methyl methacrylate, and preferred monomers B.1.2 are chosen from at least one of the monomers acrylonitrile, maleic anhydride and methyl methacrylate. Particularly preferred monomers are B.1.1 styrene and B.1.2 acrylonitrile.

Graft bases B.2 which are suitable for the graft polymers B are, for example, diene rubbers, EP(D)M rubbers, that is to say those based on ethylene/propylene and optionally diene, and acrylate, polyurethane, silicone, chloroprene and ethylene/vinyl acetate rubbers.

Preferred graft bases B.2 are diene rubbers, for example based on butadiene and isoprene, or mixtures of diene rubbers or copolymers of diene rubbers or mixtures thereof with further copolymerizable monomers (e.g. according to B.1.1 and B.1.2). Pure polybutadiene rubber is particularly preferred.

The glass transition temperature is determined by means of dynamic differential scanning calorimetry (DSC) in accordance with DIN EN 61006 at a heating rate of 10 K/min with determination of the Tg as a midpoint determination (tangent method).

Particularly preferred polymers B are, for example, ABS polymers (emulsion, bulk and suspension ABS) such as are described e.g. in DE-OS 2 035 390 (=U.S. Pat. No. 3,644,574) or in DE-OS 2 248 242 (=GB 1 409 275) and in Ullmanns, Enzyklopädie der Technischen Chemie, vol. 19 (1980), p. 280 et seq. The gel content of the graft base B.2 is at least 30 wt. %, preferably at least 40 wt. % (measured in toluene).

The graft copolymers B are prepared by free radical polymerization, e.g. by emulsion, suspension, solution or bulk polymerization, preferably by emulsion or bulk polymerization.

Particularly suitable graft rubbers are also ABS polymers which are prepared in the emulsion polymerization process by redox initiation with an initiator system of organic hydroperoxide and ascorbic acid in accordance with U.S. Pat. No. 4,937,285.

Since as is known the grafting monomers are not necessarily grafted completely on to the graft base during the grafting reaction, according to the invention graft polymers B are also understood as meaning those products which are produced by (co)polymerization of the grafting monomers in the presence of the graft base and are also obtained during the working up.

Suitable acrylate rubbers according to B.2 of the polymers B are preferably polymers of acrylic acid alkyl esters, optionally with up to 40 wt. %, based on B.2, of other polymerizable, ethylenically unsaturated monomers. The preferred polymerizable acrylic acid esters include C1 to C8-alkyl esters, for example methyl, ethyl, butyl, n-octyl and 2-ethylhexyl esters; haloalkyl esters, preferably halo-C1-C8-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monofunctional alcohols having 3 to 12 C atoms, or of saturated polyols having 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of the crosslinking monomers is preferably 0.02 to 5.00, in particular 0.05 to 2.00 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerizable, ethylenically unsaturated monomers which can optionally serve for preparation of the graft base B.2 in addition to the acrylic acid esters are e.g. acrylonitrile, styrene, α-methylstyrene, acrylamides, vinyl C1-C6-alkyl ethers, methyl methacrylate and butadiene. Preferred acrylate rubbers as the graft base B.2 are emulsion polymers which have a gel content of at least 60 wt. %.

Further suitable graft bases according to B.2 are silicone rubbers having grafting-active sites, such as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The average particle size d50 is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

C. Polyalkylene Terephthalates.

The polyalkylene terephthalates are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates comprise at least 80 wt. %, preferably at least 90 wt. %, based on the dicarboxylic acid component, of terephthalic acid radicals and at least 80 wt. %, preferably at least 90 wt. %, based on the diol component, of radicals of ethylene glycol and/or butane-1, 4-diol.

The preferred polyalkylene terephthalates can comprise, in addition to terephthalic acid radicals, up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can comprise, in addition to radicals of ethylene glycol or butane-1,4-diol, up to 20 mol %, preferably up to 10 mol %, of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1, 3-diol, hexane-2,5-diol, 1,4-di-(β-hydroxyethoxy)-benzene, 2,2-bis-(4-hydroxycyclohexyl)-propane, 2,4-dihydroxy-1,1, 3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of 3- or 4-functional alcohols or 3- or 4-basic carboxylic acids, e.g. in accordance with DE-A 1 900 270 and U.S. Pat. No. 3,692, 744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and/or mixtures of these polyalkylene terephthalates are particularly preferred.

Mixtures of polyalkylene terephthalates comprise 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

D. Inorganic Fillers

These inorganic fillers are special inorganic particles having a grain shape chosen from the group which includes spherical/cubic, tabular/discus-shaped and lamellar geometries. A stalk-like grain shape is not suitable in the context of the present invention.

Inorganic fillers having a spherical or lamellar geometry, preferably in finely divided and/or porous form having a large external and/or internal surface area are suitable in particular. These are preferably thermally inert inorganic materials, in particular based on nitrides, such as boron nitride, or are oxides or mixed oxides, such as cerium oxide, aluminum oxide, or are carbides, such as tungsten carbide, silicon carbide or boron carbide, powdered quartz, such as quartz flour, amorphous SiO2, ground sand, glass particles, such as glass powder, in particular glass spheres, silicates or alumosilicates, graphite, in particular highly pure synthetic graphite. In this context, quartz and talc are preferred in particular, and quartz (spherical grain shape) is most preferred.

The fillers used in the invention are characterized by an average diameter d50% of from 0.1 to 10 μm, preferably from 0.2 to 8.0 μm, further preferably from 0.5 to 5 μm.

In a preferred embodiment, component D is finely divided quartz flours which have been prepared from processed quartz sand by iron-free grinding with subsequent air separation.

The silicates used in the invention are characterized by an average diameter d50% of from 2 to 10 μm, preferably from 2.5 to 8.0 μm, further preferably from 3 to 5 μm, and particularly preferably of 3 μm, an upper diameter d95% of from correspondingly 6 to 34 μm, further preferably from 6.5 to 25.0 μm, still further preferably from 7 to 15 μm, and particularly preferably of 10 μm being preferred.

Preferably, the silicates have a specific BET surface area, determined by nitrogen adsorption in accordance with ISO 9277, of from 0.4 to 8.0 m2/g, further preferably from 2 to 6 m2/g, and particularly preferably from 4.4 to 5.0 m2/g.

Silicates which are further preferred have only a maximum of 3 wt. % of secondary constituents, wherein preferably the content of Al2O3 is <2.0 wt. %,
Fe2O3 is <0.05 wt. %,
(CaO+MgO) is <0.1 wt. %.
(Na2O+K2O) is <0.1 wt. %, in each case based on the total weight of the silicate.

Preferably, silicates having a pH, measured in accordance with ISO 10390 in aqueous suspension, in the range of 6 to 9, further preferably 6.5 to 8.0 are employed.

They moreover have an oil absorption number according to ISO 787-5 of from preferably 20 to 30 g/100 g.

A further advantageous embodiment uses talc in the form of finely ground types having an average particle diameter d50 of <10 μm, preferably <5 μm, particularly preferably <2 μm, very particularly preferably <1.5 μm.

The grain size distribution is determined by air separation.

Inorganic fillers, in particular silicates, which have a coating with organosilicon compounds are particularly preferably employed, epoxysilane, methylsiloxane and methacrylsilane sizes preferably being employed. An epoxysilane size is particularly preferred.

The sizing of inorganic fillers is carried out by the general processes known to the person skilled in the art.

E. Further Additives

The compositions can comprise further additives as component E. Possible further additives according to component E are, in particular, conventional polymer additives, such as flameproofing agents (e.g. organic phosphorus or halogen compounds, in particular oligophosphate based on bisphenol A), antidripping agents (for example compounds of the substance classes of fluorinated polyolefins, e.g. polytetrafluoroethylene, the silicones and aramid fibres), lubricants and mold release agents, preferably pentaerythritol tetrastearate, nucleating agents, UV or IR absorbers, stabilizers (for example UV, heat and/or hydrolysis stabilizers and antioxidants), as well as dyestuffs and pigments (for example carbon black, titanium dioxide or iron oxide).

Stabilizers which are employed are, in particular, phosphorus-based and/or phenolic stabilizers, preferably tris(2,4-di-tert-butylphenyl) phosphite or 2,6-di-tert-butyl-4-(octadecanoxy-carbonylethyl)phenol and mixtures thereof.

UV absorbers or IR absorbers can further be present. Suitable UV absorbers are described, for example, in EP 1 308 084 A1, in DE 102007011069 A1 and in DE 10311063 A1. Suitable IR absorbers are disclosed, for example. in EP 1 559 743 A1, EP 1 865 027 A1, DE 10022037 A1, DE 10006208 A1 and in Italian patent applications RM2010A000225, RM2010A000227 and RM2010A000228. Of the IR absorbers mentioned in the cited literature, preference is given to those based on boride and tungstate and also to absorbers based on ITO and ATO and combinations thereof.

F. Colorants

F1. Green or Blue Colorant

Green colorants are especially preferred colorants of the formulas (1) and (2a/2b/2c):

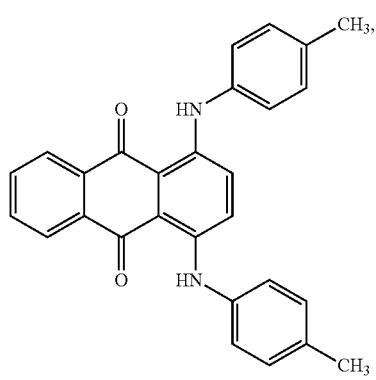

(1)

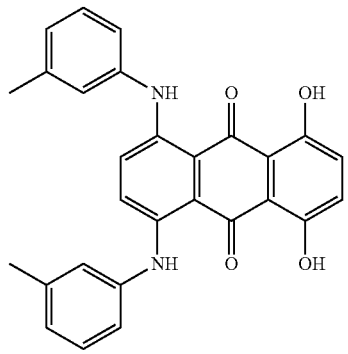

(2a)

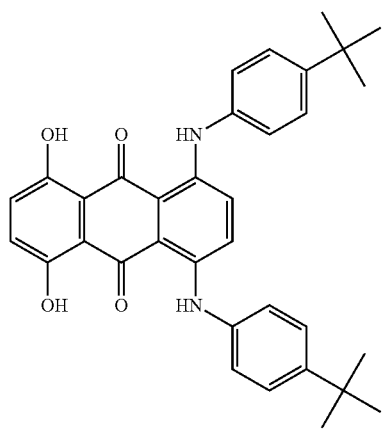

-continued

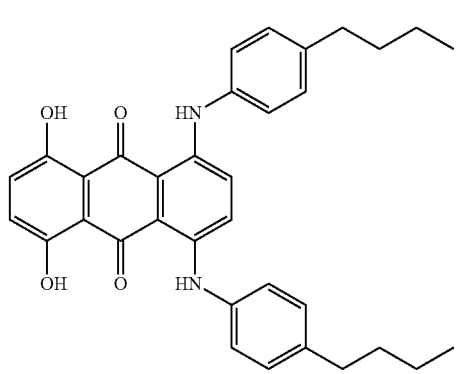

(2b)

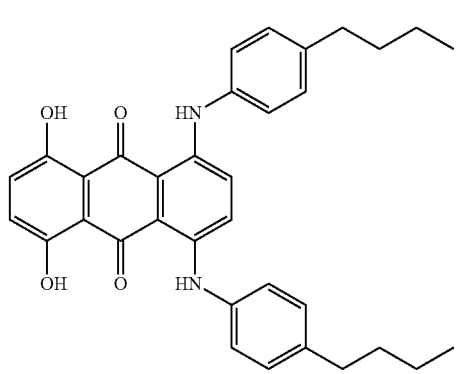

(2c)

The colorant of the formula (1) is known by the name Macrolex Green 5B from Lanxess Deutschland GmbH, Cologne, Germany, Color Index Number 61565, CAS Number: 128-90-3, and is an anthraquinone dye.

Colorants of the formulas (2a), (2b) and (2c) are known inter alia under the name Macrolex Green G (Solvent Green 28).

Blue colorants which are used are preferably colorants of the formulas (3) and/or (4a/4b) and/or (5a/5b):

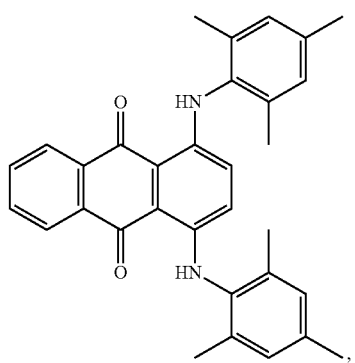

(3)

available under the name "Keyplast Blue KR", CAS number 116-75-6,

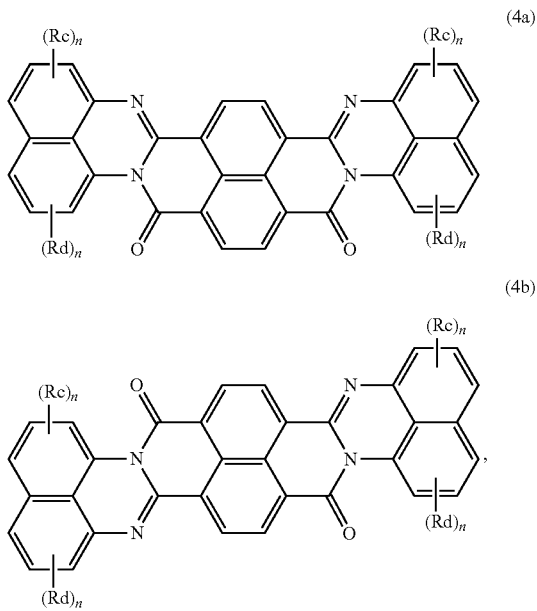

(4a)

(4b)

wherein—Rc and Rd are independently a linear or branched alkyl radical or halogen, preferably methyl, ethyl, propyl, isopropyl, butyl, isobutyl, tert-butyl, pentyl, neopentyl, hexyl, thexyl, or Cl, on preferably methyl, Cl and particularly preferably Cl,—n is independent of the respective R is a natural number between 0 and 3, wherein the rest for n=0 is hydrogen. In a preferred embodiment, Rc and/or Rd are Cl and are in o and/or p positions to the carbon atoms which carry the amine functionalities, such as di-orthochlomapthalino-, di-ortho, mono-para-chlomaphthalino, as well as mono-ortho-naphthalino. Furthermore, in a preferred embodiment, Rc and Rd each represent a tert-butyl radical, which is preferably in the meta position relative to the carbon atoms carrying the nitrogen functionalities. In a particularly preferred embodiment, n=0 in all rings, so that all Rc and Rd=H.

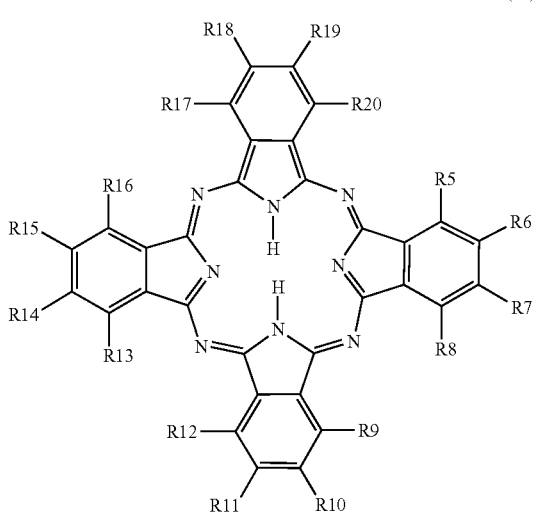

(5a)

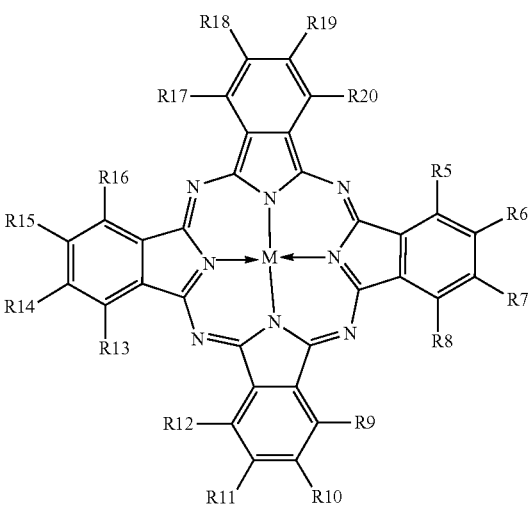

(5b)

The radicals R (5-20) are each, independently of one another, hydrogen, methyl, ethyl, propyl, isopropyl, butyl, isobutyl, tert-butyl, pentyl, neopentyl, hexyl, thexyl, fluorine, chlorine, bromine, sulfone, CN. Preferably, R (5-20) is the same in all positions. More preferably, R (5-20) is in all positions H. In an alternative embodiment, R (5-20) is C in all positions.

M is preferably aluminum (with R=H: aluminum phthalocyanine, CAS: 14154-42-8). Nickel (with R=H: nickel phthalocyanine, CAS: 14055-02-8), cobalt (with R=H: cobalt phthalocyanine, CAS: 3317-67-7), iron (with R=H: iron phthalocyanine, CAS: 132-16-1), zinc (with R=H: zinc phthalocyanine, CAS: 14320-04-08), copper (with R=H: copper phthalocyanine, CAS: 147-14-8, with R=H and C: polychloroprene phthalocyanine, CAS: 1328-53-6, with R=Cl: hexadecachlorophthalocyanine, CAS: 28888-81-5, with R=Br: hexadecabromophthalocyanine, CAS: 28746-04-5), manganese (with R=H: manganese phthalocyanine, CAS: 14325-24-7).

Especially preferred is the combination of M=Cu and R=H for all positions. Thus, a compound of structure (5b) with M=Cu and R (5-20)=H is available under the brand names Heliogen Blue K 6911 D or Helion Blue K 7104 LW from BASF AG, Ludwigshafen, Germany.

Compounds of structure (5a) are e.g. Heliogen Blue L 7460 from BASF AG, Ludwigshafen, Germany.

Furthermore, as blue colorants can be used:
Colorants of the formula (6), available under the name "Macrolex Blue 3R Gran"

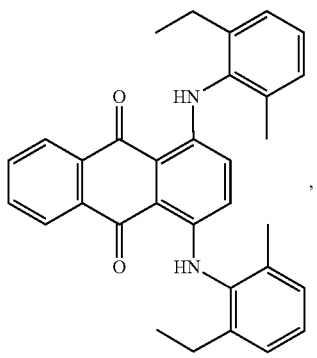
(6)

and/or colorants of the formula (7), obtainable under the name "Macrolex Blue RR" (CAS 32724-62-2, Solvent Blue 97, CI 615290),

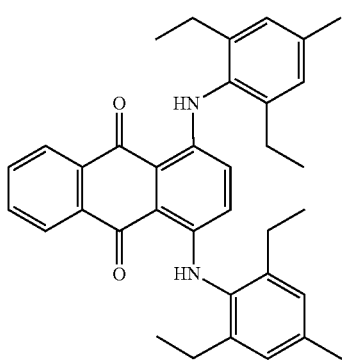
(7)

Furthermore, can be used as a blue colorant:

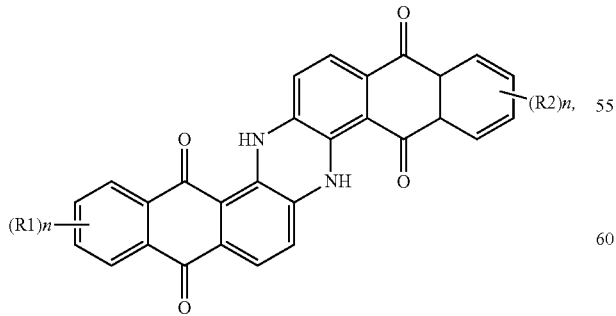
(8)

in which R1 and R2 independently of one another are a linear or branched alkyl radical, or halogen, preferably methyl, ethyl, propyl, isopropyl, butyl, isobutyl, tert-butyl, pentyl, neopentyl, hexyl, thexyl, or Cl preferably methyl, Cl and particularly preferably Cl. n stands for a natural number between 0 and 4. In a particularly preferred embodiment, n=0 in all rings, so that all R 1 and R 2=H.

Colorants of this structure (8) are commercially available under the Paliogen Blue series from BASF AG. When using colorants of structure (8), in particular the pigments are preferred, the bulk volume (determined according to DIN ISO 787-11: 1995-10) of 2 1/kg—10 1/kg, preferably 3 Pkg—8 1/kg, a specific surface (determined according to DIN 66132: 1975-07) of 5 m 2/g—60 m 2/g, preferably 10 m 2/g—55 m 2/g, and a pH (determined according to DIN ISO 787-9) from 4 to 9.

F2. Red or Violet Colorant

The red colorant used is preferably a colorant of the formula (9), obtainable under the name "Macrolex Red 5B", having the CAS number 81-39-0:

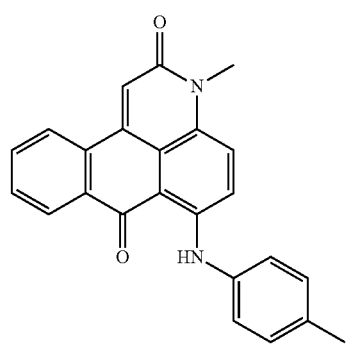
(9)

Furthermore, colorants of the formulas (10) with the CAS number 71902-17-5 and (11) with the CAS number 89106-94-5 can be used:

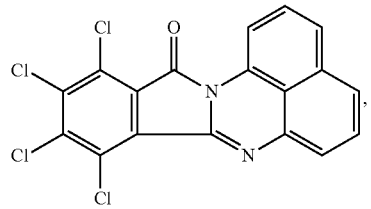
(10)

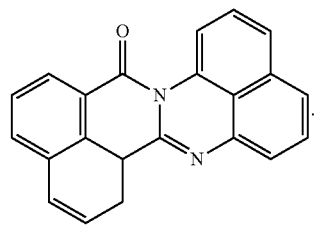
(11)

Preferred purple colorants are colorants of the formulas (12) with the CAS number 61951-89-1, (13), obtainable under the name "Macrolex Violet B" from Lanxess AG, with the CAS number 81-48-1, or (! 4a/l4b) used:

(12)

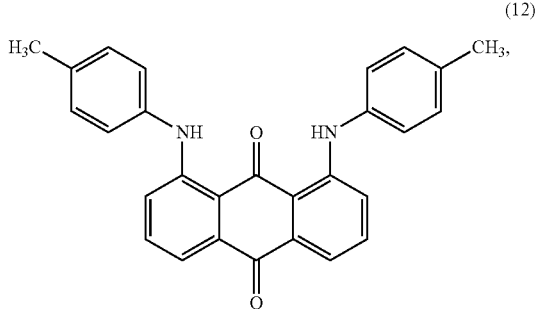

(13)

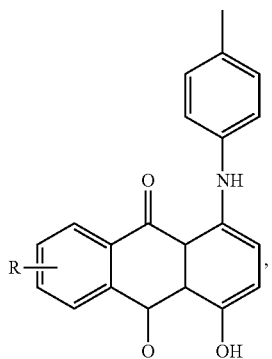

wherein R is selected from the group consisting of H and p-methylphenylamine residue; before given is R=H;

(14a)

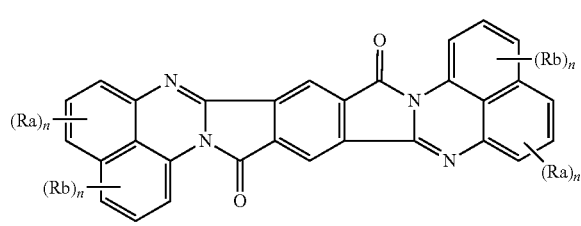

(14b)

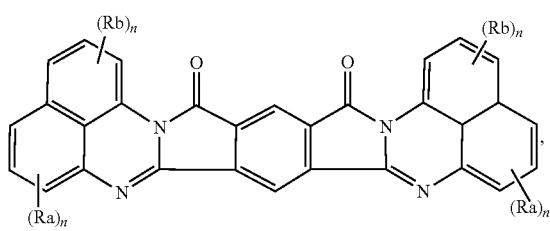

in which Ra and Rb independently of one another are a linear or branched alkyl radical or halogen, preferably methyl, ethyl, propyl, isopropyl, butyl, isobutyl, tert-butyl, pentyl, neopentyl, hexyl, thexyl, or Cl, more preferably methyl, C and particularly preferably Cl. n is independent of the respective R is a natural number between 0 and 3, wherein the rest for n=0 is hydrogen. In a preferred embodiment, Ra and/or Rb are Cl and are in the ortho and/or para positions to the carbon atoms which carry the amino functionalities, such as di-orthochloromapthalino, di-ortho, mono-para-chlomaphthalene, and mono-ortho-naphthalino. Furthermore, in a preferred embodiment, Ra and Rb each represent a tert-butyl radical, which is preferably in the meta position relative to the carbon atoms carrying the nitrogen functionalities. In a particularly preferred embodiment, n=0 in all rings, so that all Ra and Rb=H.

Furthermore, colorants may be used which correspond to the formula (15) available under the name "Macrolex Red-Violet R", CAS number 6408-72-6:

(15)

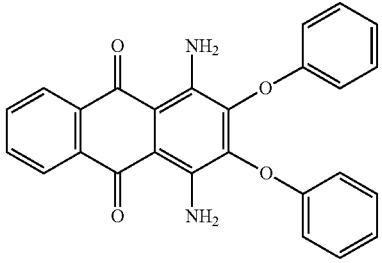

G. Thermally Conductive Additive

In some compositions, a thermally conductive additive may be included. Such an additive may be graphene, graphite, aluminum or other metal particles, carbon fiber, or other conductor, or thermally conductive polymers. In a preferred embodiment, expanded graphite is the thermally conductive additive.

Expanded graphite and methods of its production are known to those skilled in the art. Expanded graphite useful is present in an amount ranging from 10% to 70% of the composition of the present invention, more preferably from 20% to 60% and most preferably from 30% to 50%. The expanded graphite may be present in the composition of the present invention in an amount ranging between any combination of these values, inclusive of the recited values. The present inventors have found that at least 90% of the particles of the expanded graphite should have a particle size of at least 200 microns.

H. Flow Enhancers

The diglycerol esters employed as flow enhancers are esters of carboxylic acids and diglycerol. Esters based on various carboxylic acids are suitable. The esters may also be based on different isomers of diglycerol. It is possible to use not only monoesters but also polyesters of diglycerol. It is also possible to use mixtures instead of pure compounds.

Where the composition includes flow enhancers, the composition may preferably be free of demolding agents such as glycerol monostearate (GMS) since the diglycerol ester itself acts as a demolding agent.

I. Heat and/or Transesterification Stabilizers

The compositions may optionally comprise one or more heat and/or transesterification stabilizers.

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228-PC), bis(2,6-di-tert-butyl-4-methylphenyl)pentaerythritol diphosphite (ADK STAB PEP-36). Said heat stabilizers are employed alone or in admixture (for example Irganox® B900 (mixture of Irgafos® 168 and Irganox® 1076 in a 1:3 ratio) or Doverphos® S-9228-PC with Irganox® B900/Irganox® 1076).

Preferably present transesterification stabilizers are phosphates or sulfonic esters. A preferably present stabilizer is triisooctyl phosphate.

J. Phosphorus Compound

The composition may optionally comprise a phosphorus compound selected from the group of the monomeric and oligomeric phosphoric and phosphonic esters; mixtures of two or more components selected from one or various of these groups may also be employed.

Monomeric and oligomeric phosphoric and/or phosphonic esters used in accordance with the invention are phosphorus compounds of the general formula (V)

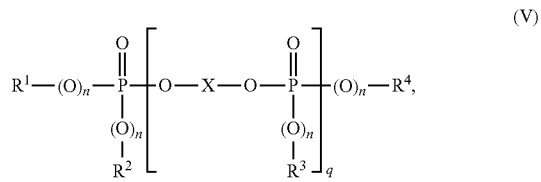
(V)

in which $R^1$, $R^2$, $R^3$ and $R^4$ independently of one another are $C_1$- to $C_8$-alkyl, in each case optionally halogenated and in each case branched or unbranched, and/or $C_5$- to $C_6$-cycloalkyl, $C_6$- to $C_{20}$-aryl or $C_7$- to $C_{12}$-aralkyl, in each case optionally substituted by a branched or unbranched alkyl, and/or halogen, preferably chlorine and/or bromine, n independently at each occurrence is 0 or 1, q is an integer from 0 to 30, and X is a monocyclic or polycyclic aromatic radical having 6 to 30 C atoms or is a linear or branched aliphatic radical having 2 to 30 C atoms, it being possible for the radical in each case to be substituted or unsubstituted, bridged or unbridged.

Preferably $R^1$, $R^2$, $R^3$ and $R^4$ independently of one another are branched or unbranched $C_1$- to $C_4$-alkyl, phenyl, naphthyl or $C_1$- to $C_4$-alkyl-substituted phenyl. In the case of aromatic groups $R^1$, $R^2$, $R^3$ and/or $R^4$, they may in turn be substituted by halogen groups and/or alkyl groups, preferably chlorine, bromine and/or $C_1$- to $C_4$-alkyl, branched or unbranched. Particularly preferred aryl radicals are cresyl, phenyl, xylenyl, propylphenyl or butylphenyl, and also the corresponding brominated and chlorinated derivatives thereof.

X in the formula (V) derives preferably from diphenols.

n in the formula (V) is preferably 1.

q is preferably 0 to 20, more preferably 0 to 10, and in the case of mixtures comprises average values from 0.8 to 5.0, preferably 1.0 to 3.0, more preferably 1.05 to 2.00 and very preferably from 1.08 to 1.60.

A preferred phosphorus compound of the general formula V is a compound of the formula I:

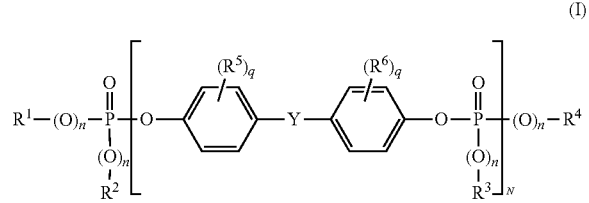
(I)

in which $R^1$, $R^2$, $R^3$ and $R^4$ in each case independently of one another are linear or branched $C_1$- to $C_8$-alkyl and/or $C_5$- to $C_6$-cycloalkyl, $C_6$- to $C_1$-aryl or $C_7$- to $C_{12}$-aralkyl each optionally substituted by linear or branched alkyl, n independently at each occurrence is 0 or 1, q independently at each occurrence is 0, 1, 2, 3 or 4, N is a number between 1 and 30, $R^5$ and $R^6$ independently of one another are linear or branched $C_1$- to $C_4$-alkyl, preferably methyl, and Y is linear or branched $C_1$- to $C_7$-alkylidene, linear or branched $C_1$- to $C_7$-alkylene, $C_5$- to $C_{12}$-cycloalkylene, $C_5$- to $C_{12}$-cycloalkylidene, —O—, —S—, —SO—, $SO_2$ or —CO—.

X in formula V is more preferably:

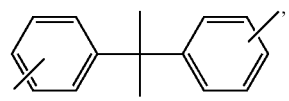,

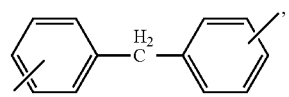,

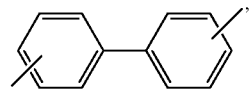,

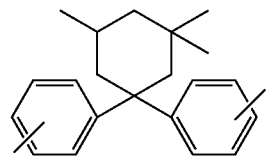

or their chlorinated and/or brominated derivatives. Preferably X (with the adjacent oxygen atoms) derives from hydroquinone, bisphenol A or diphenylphenol. Likewise preferably X derives from resorcinol. With particular preference X derives from bisphenol A.

Phosphorus compounds of the formula (V) are, in particular, tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate and bisphenol A-bridged oligophosphate. The use of oligomeric phosphoric esters of the formula (V) which derive from bisphenol A is especially preferred.

Extremely preferred as the phosphorus compound is bisphenol A-based oligophosphate of formula (Va).

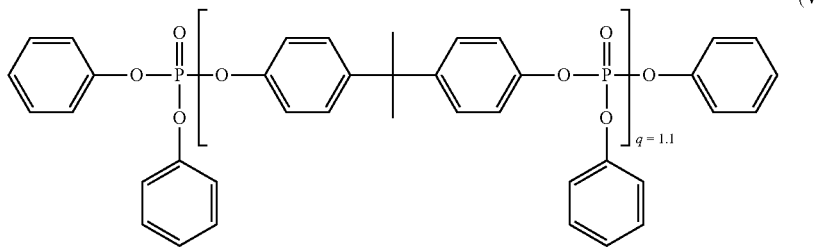

Particularly preferred, moreover, are oligophosphates analogous to the formula (Va), in which q is between 1.0 and 1.2, preferably 1.1.

The phosphorus compounds of component C are known (cf. e.g. EP 0 363 608 A1, EP 0 640 655 A2) or can be prepared by known methods in an analogous way (e.g. Ullmanns Enzyklopadie der technischen Chemie, Vol. 18, p. 301 ff., 1979; Houben-Weyl, Methoden der organischen Chemie, Vol. 12/1, p. 43; Beilstein Vol. 6, p. 177).

Preference is given to using mixtures with the same structure and different chain lengths, with the reported value of q being the average value of q. The average value of q is determined by ascertaining the composition of the phosphorus compound mixture (molecular weight distribution) by means of high-pressure liquid chromatography (HPLC) at 40° C. in a mixture of acetonitrile and water (50:50) and using this to calculate the average values for q.

K. Ethylene/Alkyl (Meth)Acrylate Copolymer

Optional Component K may be an ethylene/alkyl (meth) acrylate copolymer of the formula (VI),

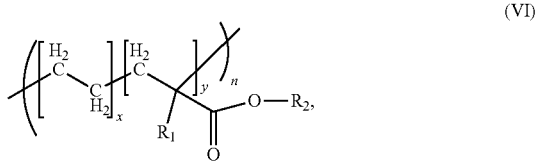

where
$R_1$ is methyl or hydrogen,
$R_2$ is hydrogen or a $C_1$- to $C_{12}$-alkyl radical, preferably methyl, ethyl, propyl, isopropyl, butyl, sec-butyl, tert-butyl, isobutyl, hexyl, isoamyl or tert-amyl,
x and y are each an independent degree of polymerization (integer), and
n is an integer ≥1.

The ratios of the degrees of polymerization x and y are preferably in the range of x:y=1:300 to 90:10.

The ethylene/alkyl (meth)acrylate copolymer may be a random, block or multi-block copolymer or may comprise mixtures of these structures. Used in one preferred embodiment are branched and unbranched ethylene/alkyl (meth) acrylate copolymers, more preferably linear ethylene/alkyl (meth)acrylate copolymers.

The melt flow index (MFR) of the ethylene/alkyl (meth) acrylate copolymer (measured at 190° C. under a load of 2.16 kg, ASTM D1238) is preferably in the range of 2.5-40.0 g/(10 min), more preferably in the range of 3.0-10.0 g/(10 min), very preferably in the range of 3.0-8.0 g/(10 min).

Used with preference in compositions of the invention is Elvaloy© 1820 AC (DuPont). This is an ethylene/methyl acrylate copolymer having a methyl acrylate content of 20% and a melt flow index of 8 g/(10 min), determined at 190° C. and 2.16 kg according to ASTM D1238.

L. Transparent Polycarbonate Lens Substrate

Component L is a transparent aromatic polycarbonate-based thermoplastic composition, comprising at least 80 wt. %, preferably at least 90%, more preferably at least 95 wt. %, aromatic polycarbonate, and optionally 0.2-5.0 wt. % UV absorber. Component L has a light transmission in the range of 380 to 780 nm of greater than 84%, preferably greater than 87%, more preferably greater than 89%, determined at a layer thickness of 4 mm according to DIN ISO 13468-2: 2006 (D65, 10°). Furthermore, the composition preferably has a haze value of less than 5%, determined to ASTM D1003:2013 at a layer thickness of 4 mm, preferably on a specimen with wall thickness 4 mm and plane-parallel surfaces.

M. Protective Coating

Various methods are known for producing a scratch resistant coating within the meaning of the present invention. For example, epoxy-, acrylic-, polysiloxane-, colloidal-silica-gel- or inorganic/organic- (hybrid systems) based lacquers can be used. These systems can be applied, for example, by dipping processes, spin coating, spraying processes or flood coating. Curing can take place thermally or by means of UV radiation. In a particular embodiment, the scratch-resistant layer is applied directly to the support in an inline process (direct coating/direct skinning).

Single-layer or multi-layer systems can be used. The scratch-resistant coating can be applied, for example, directly or after preparation of the substrate surface with a primer. A scratch-resistant coating can further be applied by plasma-assisted polymerisation processes, for example via an $SiO_2$ plasma.

It is further possible to use specific injection moulding processes, such as, for example, the back injection moulding of surface-treated films, to apply a scratch-resistant coating to the resulting moulded article. Various additives, such as, for example, UV absorbers derived, for example, from triazoles or triazines, can be present in the scratch-resistant layer. IR absorbers of organic or inorganic nature can further be present. Such additives can be present in the scratch-resistant lacquer itself or in the primer layer. The thickness of the scratch-resistant layer is from 1 to 20 nm, preferably from 2 to 15 nm. Below 1 μm, the durability of the scratch-resistant layer is unsatisfactory. Above 20 nm, cracks occur more frequently in the lacquer. The base material according to the invention, which is described in the present invention, is preferably provided with an above-described scratch-resistant and/or antireflection coating after the injection-moulded article has been finished, because the preferred field of use is in the field of window or automotive glazing.

For polycarbonates there is preferably used a primer comprising UV absorber in order to improve the adhesion of the scratch-resistant lacquer. The primer can comprise further stabilisers such as, for example, HALS systems (stabilisers based on sterically hindered amines), adhesion promoters, flow aids. The resin in question can be selected from a large number of materials and is described, for example, in Ullmann's Encyclopedia of Industrial Chemistry, 5th Edition, Vol. A18, pp. 368-426, VCH, Weinheim 1991. Polyacrylates, polyurethanes, phenol-based. melamine-based, epoxy and alkyd systems or mixtures of those systems can be used. The resin is in most cases dissolved in suitable solvents—frequently in alcohols. Depending upon the chosen resin, curing can take place at room temperature or at elevated temperatures. Temperatures of from 50° C. to 130° C. are preferably used—frequently after a large part of the solvent has briefly been removed at room temperature. Commercially available systems are, for example, SHP470, SHP470FT-2050 and SHP401 from Momentive Performance Materials. Such coatings are described, for example, in U.S. Pat. No. 6,350,512 BI, U.S. Pat. No. 5,869,185, WO 2006/108520 and EP 1308084.

Scratch-resistant lacquers (hard-coat) are preferably composed of siloxanes and preferably comprise UV absorbers. They are preferably applied by dipping or flow processes. Curing takes place at temperatures of from 50° C. to 130° C. Commercially available systems are. for example, AS4000, SHC5020 and AS4700 from Momentive Performance Materials. Such systems are described, for example, in U.S. Pat. No. 5,041,313, DE 3121385, U.S. Pat. No. 5,391,795, WO 2008/109072. The synthesis of those materials takes place in most cases by condensation of alkoxy- and/or alkylalkoxysilanes with acid or base catalysis. Nanoparticles can optionally be incorporated. Preferred solvents are alcohols such as butanol, isopropanol, methanol, ethanol and mixtures thereof.

Instead of primer/scratch-resistant coating combinations, one-component hybrid systems can be used. These are described, for example, in EP 0570165 or WO 2008/071363 or DE 2804283. Commercially available hybrid systems are obtainable, for example, under the names PHC587 or UVHC 3000 from Momentive Performance Materials. In an embodiment, the application of the lacquer is carried out by the flood process because it results in coated parts of high optical quality.

The flood process can be carried out manually with a hose or a suitable coating head or automatically in a continuous process by means of flood lacquering robots and optionally slot nozzles.

The components can be coated either while suspended or while mounted in a corresponding product holder. In the case of larger and/or 3D components, the part to be coated is suspended or placed in a suitable product holder. In the case of small parts, coating can also be carried out by hand. In that case, the liquid primer or lacquer solution to be used for the coating is poured over the sheet in the longitudinal direction starting from the upper edge of the small part, while the starting point of the lacquer on the sheet is at the same time guided from left to right over the width of the sheet. The lacquered sheets are suspended vertically from a clamp and the solvent is evaporated off and curing is carried out according to the manufacturer's instructions.

Layers for protecting against the effects of the weather are preferably based on thermoplastic plastics materials. Polycarbonates and poly- or copoly-methacrylates such as, for example, poly- or copolymethyl methacrylates (such as PMMA) are particularly preferred. The thermoplastic plastics materials are also provided with additives that their resistance to radiation in particular in the range from 180 nm to 400 nm and/or in the range from 750 nm to 2500 nm is increased significantly.

2. Compositions

The following are examples of compositions that may be used in association with the present invention. However, the inventive process described herein may be used in association with other compositions as well. All amount percentages are weight percent, unless otherwise specified.

While compositions below are described as first shot or second shot compositions, they may be interchangeable. However, if one composition is more thermally conductive than the other, then the more thermally conductive composition is preferably the second shot to be injected into the mold, to minimize the time that it may cool, because it will likely cool faster than the less thermally conductive composition. Thermal conductivity is measured using ISO 22007-2. In that method, a sensor (which acts as both the heat source and temperature sensor) is sandwiched between two flat samples of the material of interest. A known amount of power is supplied to the sensor for a pre-determined amount of time. The change in resistance as a function of time due to the increase in temperature is recorded. By monitoring the temperature increase over a short period of time, the thermal transport properties, (thermal conductivity) of the material can be obtained. In-plane thermal conductivity is measured, rather than through-plane. In a preferred embodiment, the thermal conductivity of the first shot composition is 0.1-0.3 W/m–K. In another preferred embodiment, the thermal conductivity of the second shot composition is 1-40 W/m–K.

In yet another embodiment, the melt temperature of the second shot polymer is between 200° C. and 400° C., preferably 250° C. and 340° C. The melt temperature is measured using a pyrometer positioned centrally within the melt stream as it exits the machine nozzle of an injection molding machine.

In another preferred embodiment, the two thermoplastic compositions are compatible, such that they demonstrate good adhesion when molded together. Compositions whose primary ingredient is Polycarbonate (PC), or PC/acrylonitrile butadiene styrene (ABS) blends, have been found to have high compatibility with other PC and PC/ABS blend compositions, as well as with ABS, polybutylene terephthalate (PBT) and thermoplastic polyurethane (TPU). PC and PC/ABS has also been found to have some compatibility with polymethylmethacrylate (PMMA) and polyethylene terephthalate (PET).

Bezel Compositions:

A1. Bezel Frame:

A) 30-100 parts by wt., preferably 40-90 parts by wt., particularly preferably 50-85 parts by wt. of aromatic polycarbonate and/or aromatic polyester carbonate, preferably polycarbonate, B) 0-50 parts by wt., preferably 0-40.0 parts by wt., particularly preferably 5.0-20.0 parts by wt. of rubber-modified graft polymer and/or vinyl copolymer, C) 0-50.0 parts by wt., preferably 0-30.0 parts by wt., particularly preferably 10.0-25.0 parts by wt. of polyester, preferably PBT or PET, D) 5.0-50.0 parts by wt., preferably 10.0-30.0 parts by wt., particularly preferably 15.0 to 25.0 parts by wt. of inorganic filler with a grain shape chosen from the group which includes spherical/cubic, tabular/discus-shaped and lamellar geometries.

E) 0-5.0 parts by wt., preferably 0.5-3.0 parts by wt., particularly preferably 0.75-1.25 parts by wt. of further conventional polymer additives, wherein all the parts by weight stated above are standardized such that the sum of the parts by weight of all components A+B+C+D+E in the composition is 100. In a preferred embodiment, the bezel comprises at least 50% polycarbonate, preferably at least 70% polycarbonate.

A2. Bezel Radar Window

The bezel radar window is an aromatic polycarbonate-based thermoplastic composition, comprising at least 70 wt. % aromatic polycarbonate, preferably comprising at least 90 wt. % polycarbonate, having a light transmission in the range of 380 to 780 nm of less than 25.0%, preferably less than 20%, more preferably less than 5%, yet more preferably less than 1%, still more preferably less than 0.1%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, more preferably at least 55%, even more preferably at least 65%, determined according to DIN ISO 13468-2: 2006. The transmission numbers are averages across the entire ranges of 380 to 780 nm and 800 to 2500 nm respectively, as measured at even intervals across the spectrum.

The composition preferably further comprises colorant F1 at least one green and/or a blue colorant and colorant F2 at least one red and/or violet colorant, wherein the sum of the colorants (i) to (ii) is greater than zero, and less than 5.0 wt. %, preferably 0.1 wt. % to 2.0 wt. %, most preferably 0.3 wt. % to 1.0 wt. %.

The composition for the bezel radar window may further comprise dyes, pigments and colorants, carbon black, titanium dioxide, heat stabilizers, mold release agents, UV absorbers, flame retardants, antistats and/or flow enhancers, and other additives as disclosed in published international patent applications WO2018197398 and WO2019121347.

The composition may also comprise small amounts of additional additives, preferably less than 0.1 wt. % of additives, which do not impair the transmissions listed above. The composition particularly preferably contain less than 0.1% by weight, very particularly preferably the composition is free from scattering additives, for example those based on acrylate, polyethylene, polypropylene, polystyrene, glass, aluminium oxide and/or silicon dioxide. Furthermore the composition particularly preferably contains in total less than 0.1% by weight, more preferably less than 0.05% by weight, very particularly preferably is free from, white pigments or the like, for example pigments such as titanium dioxide, kaolin, barium sulfate, zinc sulfide, aluminium oxide, aluminum hydroxide, quartz flour, from interference pigments and/or pearlescent pigments, i.e. platelet-shaped particles such as mica, graphite, talc, SiO2, chalk and/or titanium dioxide, coated and/or uncoated. Furthermore the composition particularly preferably contains in total less than 0.1% by weight, very particularly preferably the composition is free from, nanoparticulate systems such as carbon black, nanotubes, metal particles, metal oxide particles. The composition preferably also contains less than 0.1% by weight, particularly preferably is free from, pigments based on insoluble pigments, such as are described for example in DE 10057165 A1 and in WO 2007/135032 A2. As noted above, the bezel radar window is preferably substantially opaque in the visible light spectrum, such as between 380 to 780 nm, but notably allows some transmission in the wavelength range of 800 to 1600 nm, such that radar or LiDAR signals may pass through it. In an embodiment, the bezel radar window may still allow small amounts of light through it, while still being substantially opaque in the visible light spectrum within the range of 380 to 780 nm.

Housing Compositions

At least one thermoplastic is present in an amount ranging from 90% to 30% of the composition of the second shot, more preferably from 80% to 40% and most preferably from 75% to 50%. The thermoplastic is preferably aromatic polycarbonate, present in an amount ranging from 20 to 94.8 wt %, preferably 60 to 89.8 wt %, particularly preferably 60 to 80 wt %. In a preferred embodiment, the housing comprises at least 50%, more preferably at least 60% aromatic polycarbonate.

G) The thermally conductive additive is preferably expanded graphite, which is present in an amount ranging from 10% to 70% of the composition of the present invention, more preferably from 20% to 60% and most preferably from 30% to 50%. In a preferred embodiment, at least 90% of the particles of the expanded graphite should have a particle size of at least 200 microns.

H) A flow enhancer may optionally be added to the composition. In one embodiment, diglycerol ester is added in amounts of 0.2 wt % to 3.0 wt %, preferably 0.2 to 2.5 wt %, particularly preferably 0.2 to 2.0 wt %, very particularly preferably 0.2 to 1.8 wt %.

I) The second shot composition may optionally include up to 1.0 wt % of heat stabilizer and/or transesterification stabilizer and/or optionally up to 10.0 wt % of one or more further additives from the group consisting of demolding agents, flame retardants, anti-dripping agents, antioxidants, inorganic pigments, carbon black, dyes and/or inorganic fillers such as titanium dioxide, silicates, talc and/or barium sulfate.

J) A phosphorus compound may optionally be included, in an amount of 0.5 to 10 wt %, preferably 6.0 to 10.0 wt %, more preferably 6.0 to 9.0 wt %, most preferably 5.0 to 7.0 wt % of the composition.

K) An ethylene/alkyl (meth)acrylate copolymer may optionally be included, in an amount of 0.01 to 5 wt %, preferably 2 to 4.5 wt %, very preferably 3 to 4 wt % of the composition.

The above composition is for the Housing, or the Housing Heat Sink. In embodiments having a Housing Rim, the Housing Rim is preferably composed of the same material as the Bezel Frame, disclosed above.

Lens Compositions

L) An aromatic polycarbonate-based thermoplastic composition, comprising at least 80 wt. % aromatic polycarbonate, preferably at least 90%, most preferably greater than 98% aromatic polycarbonate, and optionally 0.2-5.0 wt. % UV absorber.

M) Optionally, a protective coating on the outside of the lens (component M).

3. Compounding

The preparation of polymer compositions that may be used according to the invention is carried out with the usual processes of incorporation by bringing together, mixing and homogenizing the individual constituents, the homogenizing in particular preferably taking place in the melt under the action of shearing forces. The bringing together and mixing are optionally carried out before the melt homogenization, using powder premixes.

Premixes of granules or granules and powders with the additives according to the invention can also be used.

Premixes which have been prepared from solutions of the mixing components in suitable solvents, homogenization optionally being carried out in solution and the solvent then being removed, can also be used.

In particular, the additives of the composition according to the invention can be introduced here by known processes or as a masterbatch.

The use of masterbatches is preferred in particular for introduction of the additives, masterbatches based on the particular polymer matrix being used in particular.

In this connection, the composition can be brought together, mixed, homogenized and then extruded in conventional devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

The bringing together and thorough mixing of a premix in the melt can also be carried out in the plasticizing unit of an injection molding machine. In this procedure, the melt is converted directly into a shaped article in the subsequent step.

4. Injection Molding Processes

A two shot injection molding process includes injecting a first composition, pressurizing the cavity, and then injecting a second composition. In addition, the injection temperatures of the compositions are controlled, as are the mold walls.

The process of dynamic mold temperature control in injection molding is characterized in that the mold wall is heated up swiftly before injection of the melt. Due to the elevated mold temperature, premature solidification of the melt is prevented, so that inter alia a higher casting accuracy of the mold surface is possible and the quality of the component surface improves. The temperature of the mold wall should be in the region of the Vicat temperature of the composition that is being molded +/−40° C., preferably in the region +/−20° C. The Vicat temperature is measured by ASTM D-1525. Dynamic mold temperature control is furthermore characterized in that the temperature of the mold wall after the injection operation may be controlled, to prevent cooling before and during the second shot injection, and then to allow cooling to the original temperature, and the finished component is cooled down to the mold release temperature in the mold in the conventional manner. For the examples mentioned in the following, dynamic mold temperature control with the aid of induction heating was used.

In a preferred embodiment, the mold temperature is 70° C. to 100° C. The surface temperature of the first shot material should be in the range of 80° C. to 100° C., just before overmolding of the second shot material. A high injection temperature of the second shot material is recommended, from 250° C. to 340° C. Preferably, there is no cooling step following injection of the first shot material, before injection of the second shot material.

In another embodiment, the cavity is rapidly pressurized during the second injection. It has been found that such pressurization reduces the amount the first shot material may cool before the second shot injection. However, excessive cavity pressure may lead to internal stress and a potential decrease in adhesion between the mating surfaces of the first composition and the second composition. In this embodiment, the cavity pressure is 10 to 200 MPa, preferably 20 to 150 MPa.

The injection speed is preferably high to ensure a short dwell time of the material being injected. In another preferred embodiment, injection speeds of 25 mm/sec to 200 mm/sec are preferred to minimize the cooling of the material, as well as to prevent any buildup of pressure in the cavity.

As noted above, the bezel may include two different materials: one for the bezel frame, and another for the bezel radar window. In another embodiment, the entire bezel is manufactured out of the same material as the bezel radar window. If the bezel radar window is constructed out of a different material, then it may be created by a two shot process where the second shot material, such as the bezel radar window material, molds onto an interface with the first shot material, where the bezel frame and the bezel radar window meet. Preferably, the two materials are miscible or compatible, such that each of the materials experience heating and cooling at the same rate, reducing the possibility that one material would break away from the other during the cooling process.

The bezel radar window preferably has a thickness of 1.0 to 7.0 mm, more preferably 1.0 to 6.0 mm, even more preferably 1.0 to 4.0 mm. Optionally, the bezel radar window may have an anti-reflective coating applied to the surface.

In one embodiment, the housing and bezel preferably are molded together using a two shot molding process, where the bezel is the first shot material, and the housing is the second shot material. In a preferred embodiment, a surface of the housing is molded onto a surface of the bezel, forming an interface surface, where the angles of the interface surface do not deviate from each other more than 90 degrees.

In another embodiment, the housing comprises a housing heat sink and a housing rim. The housing heat sink is molded to the housing rim using a two shot molding process described herein. The housing rim is preferably the first shot material, and the housing heat sink is the second shot material. In another preferred embodiment, a surface of the housing heat sink is molded onto a surface of the housing rim, where the angles of the interface surface do not deviate from each other more than 90 degrees.

The angles of the interface surface, including how they are determined, are shown in detail below in association with the figures. If the surfaces to be formed have one or more jagged angles, or angles greater than 90 degrees, then the resulting mold may be insufficient or uneven in areas, increasing the likelihood that such a mold may fail to adhere the surfaces, cause a visual disturbance or form into an unexpected shape that cannot be relied upon for an attachment to another part. The interface surface limited to 90 degrees allows for better adhesion and heat transfer, as well as reliable design formation. As noted above, preferably the materials are compatible with each other, such that the materials experience cooling and shrinking at the same time, reducing the possibility that one of the compositions will break away from the other during the cooling process.

5. Metallization or Coated with Metal-like Coating

Optionally, a portion of the molded part may be metalized. The application of metals to a polymer can be effected via various methods, such as e.g. by vapor deposition or sputtering. The processes are described in more detail e.g. in "Vakuumbeschichtung vol. 1 to 5", H. Frey, VDI-Verlag Düsseldorf 1995 or "Oberflächen-und Dünnschicht-Technologie" part 1, R. A. Haefer, Springer Verlag 1987.

In order to achieve a better adhesion of the metal and in order to clean the substrate surface, the substrates are usually subjected to a plasma pretreatment. Under certain circumstances, a plasma pretreatment can modify the surface properties of polymers. These methods are described e.g. by Friedrich et al. in Metallized plastics 5 & 6: Fundamental and applied aspects and H. Grünwald et al. in Surface and Coatings Technology 111 (1999) 287-296.

Alternatively, the reflector portion can be molded to the housing, or to the housing heat sink, using the two shot molding process described above, where the metalized reflector is molded first, and then the housing is molded to it. In another embodiment, the reflector portion may be molded to the housing, or to the housing heat sink, before it is metalized. In yet another embodiment, the housing or the housing heat sink comprises the reflector portion, and that portion is metalized after molding. In addition, another coating may be applied to the reflector portion before it is metalized.

Further layers, such as corrosion-reducing protective sizes, can be applied in a PECVD (plasma enhanced chemical vapor deposition) or plasma polymerization process. In these, low-boiling precursors chiefly based on siloxane are vaporized in a plasma and thereby activated, so that they can form a film. Typical substances here are hexamethyldisiloxane (HMDSO), tetramethyldisiloxane, decamethylcyclopentasiloxane, octamethylcyclotetrasiloxane and trimethoxymethylsilane.

Possible metals are, preferably, Ag, Al, Ti, Cr, Cu, VA steel, Au, Pt, particularly preferably Ag, Al, Ti or Cr.

6. Thermal Welding

Another process that may be used in association with the present invention is thermal welding. In an embodiment, the lens is attached to the bezel by thermal welding, wherein the materials are locally heated at the point, or surfaces, where they are attached. In another embodiment, the lens is attached to the housing rim by thermal welding. Thermal welding techniques that may be used include spot welding, heat welding, laser welding, sonic welding, acoustic welding and vibration welding. In a preferred embodiment, the housing rim and lens are attached by laser welding. In another embodiment, the bezel is attached to the housing rim by thermal welding, preferably by laser welding.

Alternative methods of attaching the parts include bonding, such as using an adhesive to attach the lens to the housing, or the lens to the bezel. Another method of attaching the parts is snap-fitting. The bezel may be snap-fit to the housing, or to the housing rim, or to the housing heat sink.

As shown in FIGS. 1-4, assembly 10 is made from housing 20, bezel 30 and lens 40. Housing 20 as shown includes housing rim 24 and housing heat sink 25. Housing heat sink 25 comprises fins 21 to act as heat sinks for electronic components such as LED lights that may be attached to them, and may further comprise other component supports 22 that hold other components, such as radar and LiDAR emitters, or an optical camera. Bezel 30 comprises an open portion 31 through which light from the LED lights will be emitted. As noted above, housing 20 and bezel 30 are molded to each other using two shot welding, where housing surface 23 of housing rim 24 is molded to bezel surface 32. Lens 40 is preferably laser welded to bezel 30, where lens surface 41 is welded to bezel surface 32.

Figure 5:
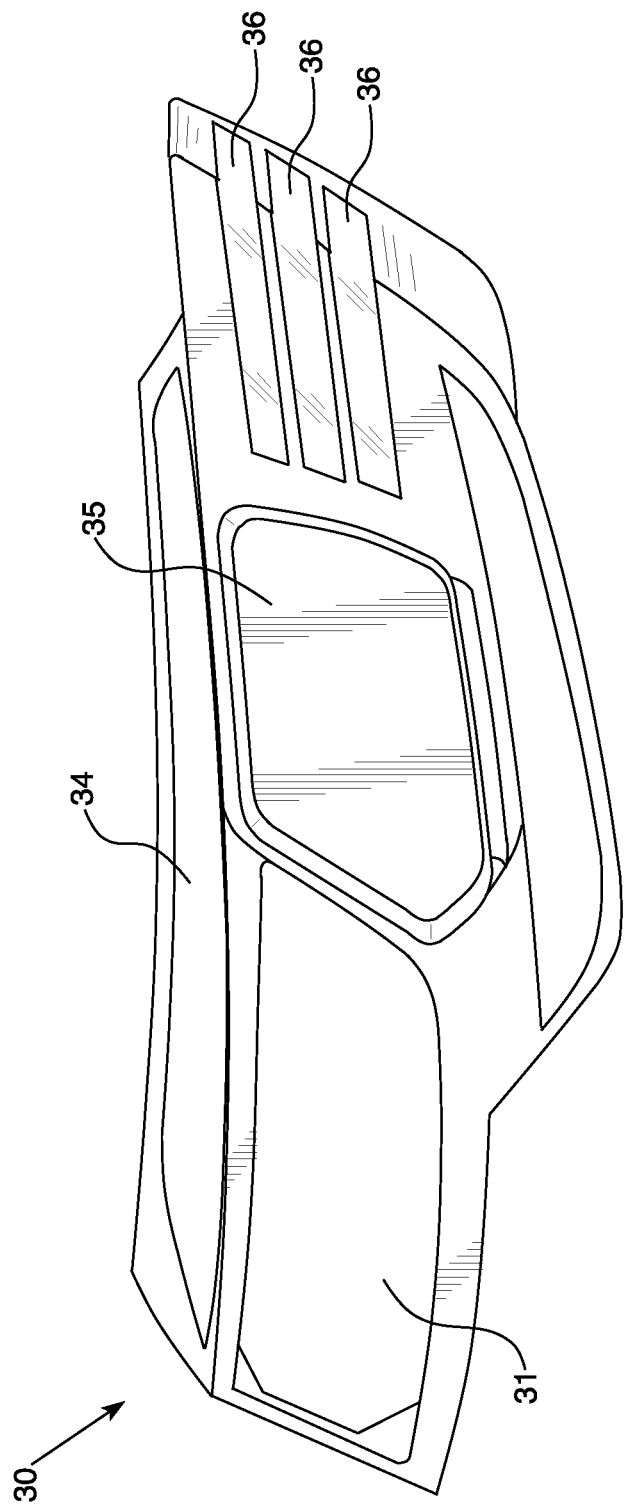
Figure 6:
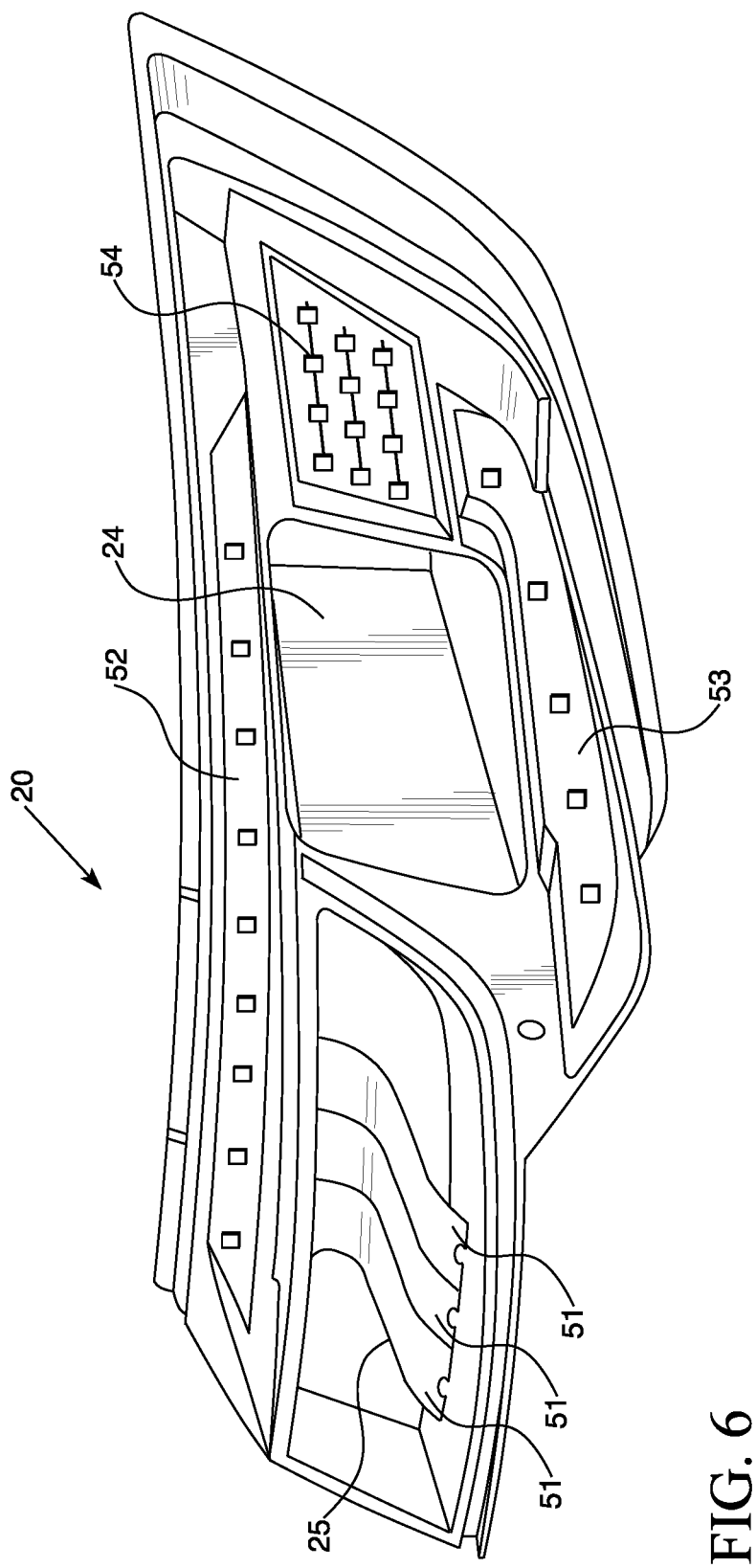

As shown in FIGS. 5-6, bezel 30 may comprise open portion 31, and bezel radar window 35. Bezel 30 may further comprise area for daytime running lights 34 and area for blinker lights 36. Housing 20 may comprise area for headlights 25 and area for radar systems 24. As shown in FIG. 6, additional components may be installed or added to housing 20, such as reflectors 51, daytime running lights 52 and 53, and blinker lights 54.

Figure 2:
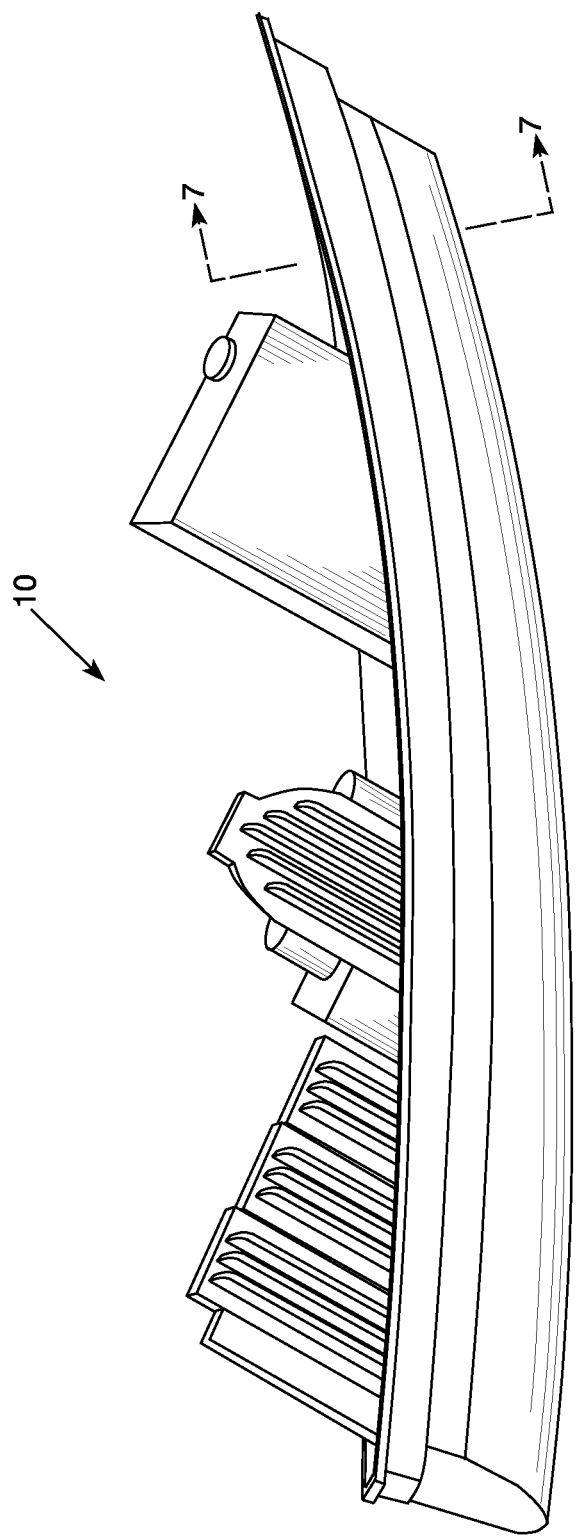
Figure 3:
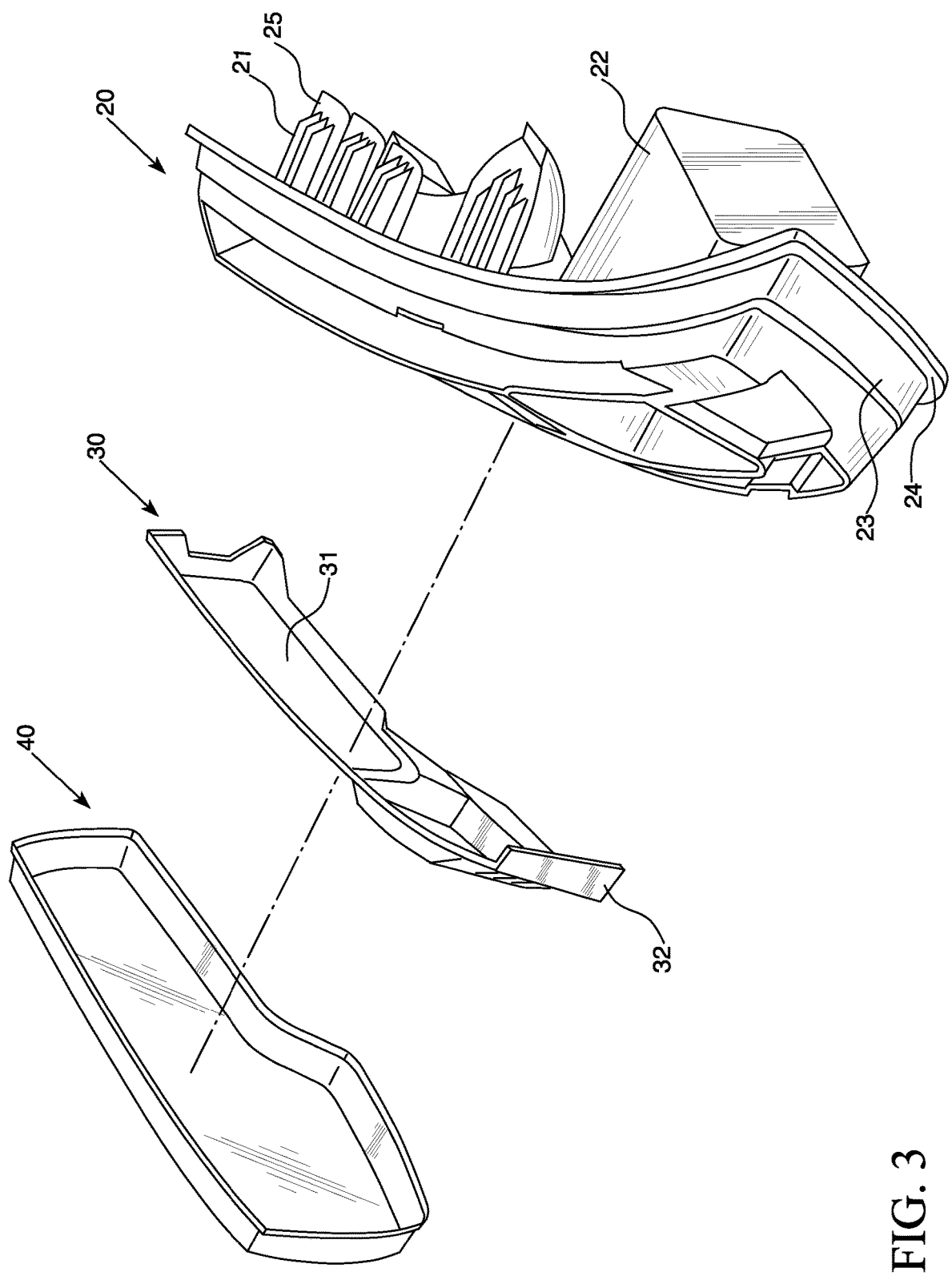
Figure 4:
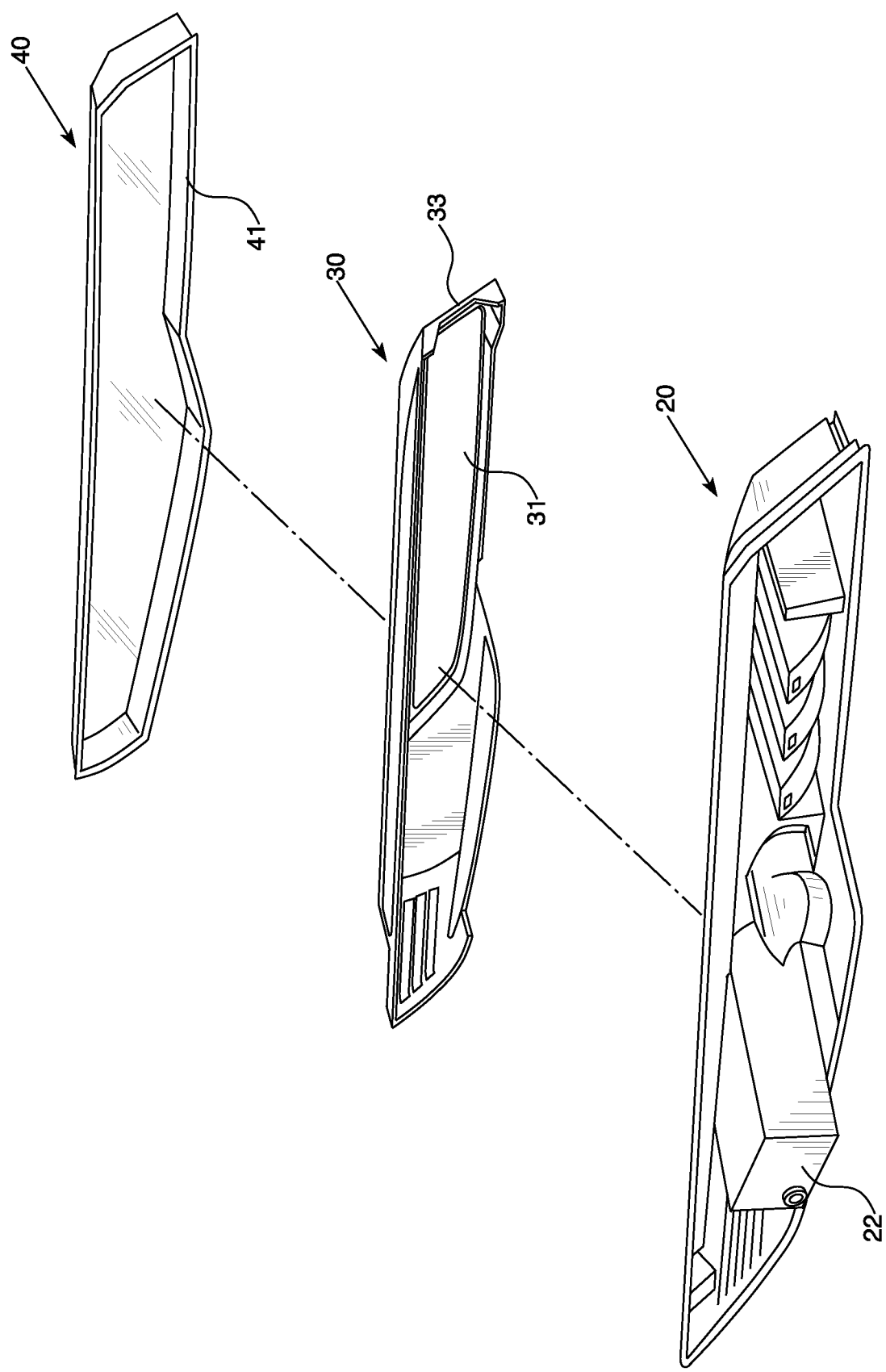

As noted above, to ensure a sufficient mold between the housing and the bezel, the molded surfaces, or interface surface, between them shall not vary more than 90 degrees, as measured from a central axis perpendicular to the bezel and the housing around which the bezel and the housing are molded, for all interface angles about the central axis. This is illustrated in FIGS. 7a-7f. At the outset, it should be noted the bezel and housing are molded together along the outside of each unit. As shown in FIG. 2, section 7-7 is taken from a central axis perpendicular to bezel 30 and housing 20, to shows a cross-section of where bezel 30 and housing 20 are molded together, at that part of assembly 10. FIGS. 7a-7f are each close-ups of the portion of bezel 30 and housing 20 where they are molded together, at either section 7-7, or at another similar section of a different bezel and housing.

Figure 7A:
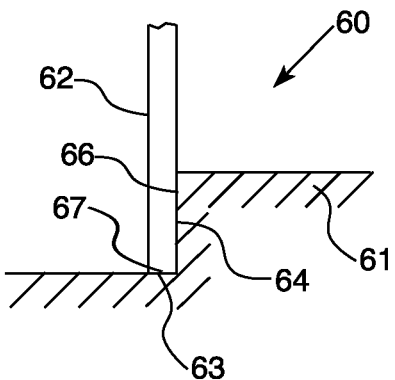
Figure 7B:
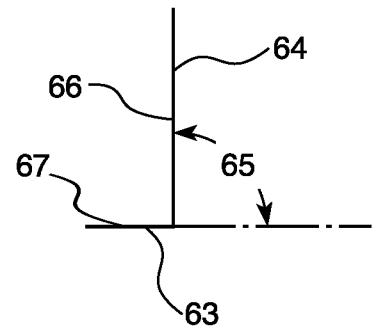

FIGS. 7a-7f illustrate the limits of which surfaces may be molded together from the bezel to the housing, or in other embodiments from the housing rim to the housing heat sink. In FIGS. 7a-7b, assembly 60 comprises housing rim 61 and bezel 62. Housing rim 61 comprises surfaces 63 and 64, and bezel 62 comprises surfaces 66 and 67. The parts are molded at two surfaces, surfaces 63 is molded to surface 67, while surface 64 is molded to surface 66, collectively referred to as the interface surface. Surfaces 63 and 67 vary from surfaces 64 and 66 by interface angle 65, which as shown is 90 degrees.

Figure 7C:
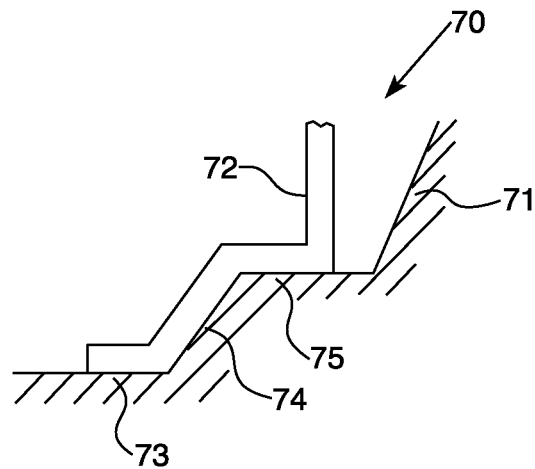
Figure 7D:
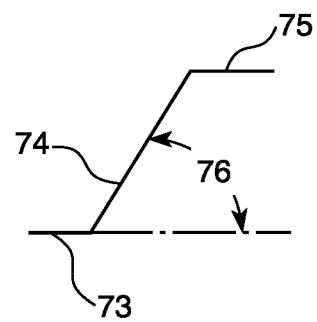

In FIGS. 7c-7d, assembly 70 comprises housing 71 and bezel 72. The parts are molded at three surfaces, surfaces 73, 74 and 75. Surfaces 73, 74 and 75 vary from each other by interface angle 76, which as shown is about 60 degrees.

Figure 7E:
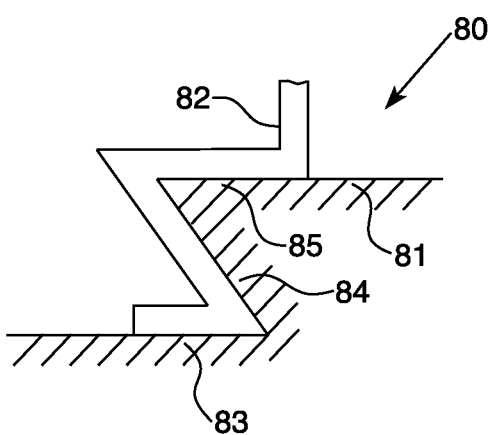
Figure 7F:
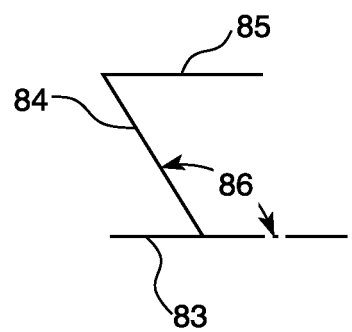

In FIGS. 7e-7f, assembly 80 comprises housing 81 and bezel 82. The parts are molded at three surfaces, surfaces 83, 84 and 85. Surfaces 83, 84 and 85 vary from each other by interface angle 86, which as shown is about 120 degrees. As can be appreciated a mold using the two shot molding process described herein would be unlikely to create the desired mold between the two surfaces. The manufacture of assembly 80 would thus not be recommended using the two shot molding technique described herein.

7. Functional Elements

According to the current invention, functional elements include light sources, for example LED modules, LED stripes, LED spots, LED boards or lamps, and sensors, e.g. LiDAR sensors, radar sensors, cameras including video cameras and IR cameras, and reflectors. Functional elements are preferably attached to the housing, or to the housing heat sink, by molding or insert molding, and also by attachments described herein, including screws, bolts and adhesives.

8. Recycling

Another advantage of the assembly described herein, is the ability to efficiently recycle an entire headlamp assembly. This may be done, when the components each comprise a minimum amount of the same materials. Different recycling schemes and repurposed materials require different minimum amounts of polycarbonate, as well as the absence of one or more additional materials. In one embodiment, each of the housing and bezel comprise at least 30% polycarbonate, more preferably at least 50% polycarbonate, even more preferably at least 70% polycarbonate, and the lens comprises at least 80% polycarbonate, more preferably at least 90% polycarbonate, even more preferably at least 98% polycarbonate. In another embodiment, the housing comprises at least 50% polycarbonate while the bezel and the lens each comprise at least 80% polycarbonate. In a different embodiment, each of the housing comprises at least 60% polycarbonate, the bezel at least 70% polycarbonate, and the lens comprises at least 80%. In another embodiment, the housing comprises at least 60% polycarbonate while the bezel and the lens each comprise at least 90% polycarbonate. In embodiments described above where the housing comprises a housing heat sink and a housing rim, the housing heat sink may comprise at least 60% polycarbonate, and the housing rim at least 70% polycarbonate. In other embodiments, the housing heat sink may comprise at least 50% polycarbonate, and the housing rim may comprise at least 80% polycarbonate. In another, the housing heat sink comprises at least 60%, while the housing rim comprises at least 90% polycarbonate.

In other embodiments, there are no attachments or adhesives between the housing, bezel and lens. In embodiments having a housing rim, there may be no attachments or adhesives between the housing heat sink, the housing rim, the bezel and the lens.

The following preferred embodiments of the present invention are summarized:

1. An assembly comprising a housing, a bezel and a lens, wherein the housing comprises a first surface and the bezel comprises a second surface, a portion of the first surface is molded to a portion of the second surface forming an interface surface, the interface surface having an interface angle that does not deviate more than 90 degrees, measured from a central axis perpendicular to the bezel and the housing around which the bezel and the housing are molded, for all interface angles about the central axis.

2. An assembly comprising a thermally conductive housing, a bezel and a lens, wherein the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006.

3. The assembly of 1 or 2, wherein the housing comprises a housing heat sink and a housing rim, and the first surface is a surface of the housing rim.

4. The assembly of any of the preceding, wherein the lens is thermally welded to the bezel or the housing.

5. The assembly of any of the preceding, wherein the lens is laser welded to the bezel or the housing.

6. The assembly of any of the preceding, wherein the housing, bezel and lens each comprise polymers that are compatible or miscible with each other.

7. The assembly of any of the preceding, wherein the housing, bezel and lens each comprise greater than 50 wt. % polycarbonate.

8. The assembly of any of the preceding, wherein the lens comprises greater than 80% polycarbonate.

9. The assembly of any of the preceding, wherein the housing has a thermal conductivity of 1-40 W/m-K.

10. The assembly of any of the preceding, wherein the housing comprises 20-60 wt. % expanded graphite, and 40-80 wt. % polycarbonate.

11. The assembly of any of the preceding, wherein the housing heat sink has a thermal conductivity of 1-40 W/m-K.

12. The assembly of any of the preceding, wherein the housing heat sink comprises 20-60 wt. % expanded graphite, and 40-80 wt. % polycarbonate.

13. The assembly of any of the preceding, wherein the housing is molded to a reflector.

14. The assembly of any of the preceding, wherein the bezel and lens each comprise at least 80 wt. % polycarbonate.

15. The assembly of any of the preceding, wherein the lens is transparent, and the bezel is opaque or translucent.

16. The assembly of any of the preceding, wherein the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006.

17. The assembly of any of the preceding, wherein the bezel comprises a thermoplastic composition portion having a thickness in the range of 1.0-6.0 mm.

18. The assembly of any of the preceding, further comprising functional elements attached to the housing.

19. The assembly of any of the preceding, wherein the functional elements are molded to the housing.

20. The assembly of any of the preceding, wherein the housing does not comprise metal.

21. The assembly of any of the preceding, wherein there are no attachments between the housing and the bezel.

22. The assembly of any of the preceding, wherein there are no attachments between the bezel and the lens.

23. The assembly of any of the preceding, wherein there are no adhesives between the housing and the bezel.

24. The assembly of any of the preceding, wherein there are no adhesives between the bezel and the lens.

25. An automotive headlamp or an automotive front end comprising the assembly of any of the preceding.

26. An assembly comprising a housing heat sink, a housing rim, a bezel and a lens, wherein the housing heat sink comprises a first surface and the housing rim comprises a second surface, a portion of the first surface is molded to a portion of the second surface forming an interface surface, the interface surface having an interface angle that does not deviate more than 90 degrees, measured from a central axis perpendicular to the housing rim around which the housing rim is molded, for all interface angles about the central axis.

27. The assembly of 26, wherein the lens is thermally welded to the bezel or the housing rim.

28. The assembly of 27, wherein the lens is laser welded to the bezel or the housing rim.

29. The assembly of any of 26-28, wherein the housing heat sink, housing rim, bezel and lens each comprise polymers that are compatible or miscible with each other.

30. The assembly of any of 26-29, wherein the housing heat sink, housing rim, bezel and lens each comprise greater than 50 wt. % polycarbonate.

31. The assembly of any of 26-30, wherein the lens comprises greater than 80% polycarbonate.

32. The assembly of any of 26-31, wherein the housing heat sink has a thermal conductivity of 1-40 W/m-K.

33. The assembly of any of 26-32, wherein the housing heat sink comprises 20-60 wt. % expanded graphite, and 40-80 wt. % polycarbonate.

34. The assembly of any of 26-33, wherein the housing heat sink is molded to a reflector.

35. The assembly of any of 26-34, wherein the bezel and lens each comprises at least 80 wt. % polycarbonate.

36. The assembly of any of 26-35, wherein the lens is transparent, and the bezel is opaque or translucent.

37. The assembly of any of 26-36, wherein the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006.

38. The assembly of any of 26-37, wherein the bezel comprises a thermoplastic composition portion having a thickness in the range of 1.0-6.0 mm.

39. The assembly of any of 26-38, further comprising functional elements attached to the housing.

40. The assembly of any of 26-39, wherein the functional elements are molded to the housing heat sink.

41. The assembly of any of 26-40, wherein the housing heat sink does not comprise metal.

42. The assembly of any of 26-41, wherein there are no attachments between the housing heat sink and the bezel, and also there are no attachments between the housing rim and the bezel.

43. The assembly of any of 26-42, wherein there are no attachments between the bezel and the lens.

44. The assembly of any of 26-43, wherein there are no adhesives between the housing heat sink and the bezel, and also there are no adhesives between the housing rim and the bezel.

45. The assembly of any of 26-44, wherein there are no adhesives between the bezel and the lens.

46. An automotive headlamp or an automotive front end comprising the assembly of any of 26-45.

What is claimed is:

1. An assembly comprising a housing heat sink, a housing rim, a bezel and a lens, wherein the bezel comprises a first surface and the housing rim comprises a second surface, a portion of the first surface is molded to a portion of the second surface forming an interface surface, the interface surface having an interface angle that does not deviate more than 90 degrees, measured from a central axis perpendicular to the housing rim around which the housing rim is molded, for all interface angles about the central axis, wherein the housing rim has a composition that is different from the composition of the housing heat sink.

2. The assembly of claim 1, wherein the housing heat sink, housing rim, bezel and lens each comprise greater than 50 wt. % polycarbonate.

3. The assembly of claim 1, wherein the housing heat sink has a thermal conductivity of 1-40 W/m-K and wherein the housing heat sink comprises 20-60 wt. % expanded graphite, and 40-80 wt. % polycarbonate.

4. The assembly of claim 1, wherein the housing heat sink is molded to a reflector.

5. The assembly of claim 1, wherein the lens is transparent, and the bezel is opaque or translucent.

6. The assembly of claim 1, wherein the bezel comprises a thermoplastic composition portion having a light transmission in the range of 380 to 780 nm of less than 20%, determined at a layer thickness of 4 mm according to DIN ISO 13468-2: 2006 (D65, 10°), and wherein the substrate layer in its respective thickness has a transmission for IR radiation in the range of 800 nm to 1600 nm of at least 40%, determined according to DIN ISO 13468-2: 2006.

7. The assembly of claim 1, wherein the bezel comprises a thermoplastic composition portion having a thickness in the range of 1.0-6.0 mm.

8. The assembly of claim 1, further comprising functional elements molded to the housing heat sink.

9. The assembly of claim 1, wherein the housing heat sink does not comprise metal.

10. The assembly of claim 1, wherein there are no attachments between the housing heat sink and the bezel, and also there are no attachments between the housing rim and the bezel.

11. The assembly of claim 1, wherein there are no attachments between the bezel and the lens.

12. The assembly of claim 1, wherein there are no adhesives between the housing heat sink and the bezel, and wherein there are no adhesives between the housing rim and the bezel.

13. The assembly of claim 1, wherein there are no adhesives between the bezel and the lens.

14. An automotive headlamp or an automotive front end comprising the assembly of claim 1.

* * * * *